United States Patent
Stump et al.

(10) Patent No.: US 11,822,906 B2
(45) Date of Patent: *Nov. 21, 2023

(54) INDUSTRIAL PROGRAMMING DEVELOPMENT WITH A CONVERTED INDUSTRIAL CONTROL PROGRAM

(71) Applicant: Rockwell Automation Technologies, Inc., Mayfield Heights, OH (US)

(72) Inventors: Andrew R Stump, Mentor, OH (US); Anthony Carrara, Strongsville, OH (US); Eashwer Srinivasan, Fremont, CA (US); Christopher W Como, Chagrin Falls, OH (US); Sharon M Billi-Duran, Euclid, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/185,525

(22) Filed: Mar. 17, 2023

(65) Prior Publication Data
US 2023/0221929 A1    Jul. 13, 2023

Related U.S. Application Data

(63) Continuation of application No. 17/340,861, filed on Jun. 7, 2021, now Pat. No. 11,640,566, which is a
(Continued)

(51) Int. Cl.
G06Q 10/0631    (2023.01)
G06N 20/00    (2019.01)
(Continued)

(52) U.S. Cl.
CPC ........... *G06F 8/34* (2013.01); *G05B 13/0265* (2013.01); *G05B 19/05* (2013.01);
(Continued)

(58) Field of Classification Search
None
See application file for complete search history.

(56) References Cited

U.S. PATENT DOCUMENTS 5,526,522 A   11/1996   Takeuchi
6,516,451 B1   2/2003   Patin
(Continued)

FOREIGN PATENT DOCUMENTS

CN    105159656 A    12/2015
CN    107463147 A    12/2017
(Continued)

OTHER PUBLICATIONS

Non-Final office action received for U.S. Appl. No. 16/584,415 dated Oct. 6, 2022, 72 Pages.
(Continued)

*Primary Examiner* — Qing Chen
(74) *Attorney, Agent, or Firm* — Amin, Turocy & Watson, LLP

(57) ABSTRACT

An industrial integrated development environment (IDE) includes a training component that improves the IDE's automated design tools over time based on analysis of aggregated project data submitted by developers over time. The industrial IDE can apply analytics (e.g., artificial intelligence, machine learning, etc.) to project data submitted by developers across multiple industrial enterprises to identify commonly used control code, visualizations, device configurations, or control system architectures that are frequently used for a given industrial function, machine, or application. This learned information can be encoded in a training module, which can be leveraged by the IDE to generate programming, visualization, or configuration recommendations. The IDE can automatically add suitable control code, visualizations, or configuration data to new control projects being developed based on an inference of
(Continued)

the developer's design goals and knowledge of how these goals have been implemented by other developers.

20 Claims, 17 Drawing Sheets

Related U.S. Application Data continuation of application No. 16/584,298, filed on Sep. 26, 2019, now Pat. No. 11,042,362.

(51) Int. Cl.
| | | |
|---|---|---|
| *G05B 19/05* | (2006.01) | |
| *G06F 8/33* | (2018.01) | |
| *G06F 8/34* | (2018.01) | |
| *G06N 5/04* | (2023.01) | |
| *G05B 13/02* | (2006.01) | |
| *G06F 8/20* | (2018.01) | |
| *G06F 8/77* | (2018.01) | |
| *G06F 18/214* | (2023.01) | |
| *G05B 19/418* | (2006.01) | |

(52) U.S. Cl.
CPC ... *G05B 19/4188* (2013.01); *G05B 19/41835* (2013.01); *G06F 8/20* (2013.01); *G06F 8/33* (2013.01); *G06F 8/77* (2013.01); *G06F 18/214* (2023.01); *G06N 5/04* (2013.01); *G06N 20/00* (2019.01); *G06Q 10/063118* (2013.01)

(56) References Cited

U.S. PATENT DOCUMENTS

| | | |
|---|---|---|
| 6,993,745 B1 | 1/2006 | Ballantyne et al. |
| 7,313,609 B1 | 12/2007 | Wischinski |
| 7,839,416 B2 | 11/2010 | Ebensberger et al. |
| 8,667,456 B1 | 3/2014 | Czymontek |
| 8,812,684 B1 | 8/2014 | Hood et al. |
| 9,223,567 B2 | 12/2015 | DeLuca et al. |
| 10,372,107 B2 | 8/2019 | Majewski et al. |
| 10,388,075 B2 | 8/2019 | Schmirler et al. |
| 10,503,632 B1 | 12/2019 | Sivanantham et al. |
| 10,559,043 B1 | 2/2020 | Schlintl |
| 10,606,576 B1 | 3/2020 | Tung et al. |
| 10,761,810 B2 | 9/2020 | Ramakrishna et al. |
| 10,832,187 B2 | 11/2020 | Sharma et al. |
| 10,936,807 B1 | 3/2021 | Walters et al. |
| 11,048,500 B2 | 6/2021 | Grant et al. |
| 11,087,053 B1 | 8/2021 | Sha et al. |
| 11,107,236 B2 | 8/2021 | Hansson |
| 2002/0004804 A1 | 1/2002 | Muenzel |
| 2002/0191023 A1 | 12/2002 | Chandhoke et al. |
| 2003/0009250 A1 | 1/2003 | Resnick et al. |
| 2003/0028364 A1 | 2/2003 | Chan et al. |
| 2004/0073404 A1 | 4/2004 | Brooks et al. |
| 2004/0088688 A1 | 5/2004 | Hejlsberg et al. |
| 2005/0257203 A1 | 11/2005 | Nattinger |
| 2005/0268288 A1 | 12/2005 | Nattinger |
| 2006/0041440 A1 | 2/2006 | Cheng et al. |
| 2006/0224534 A1 | 10/2006 | Hartman et al. |
| 2007/0016309 A1 | 1/2007 | Mckelvey et al. |
| 2007/0209038 A1 | 9/2007 | Fuchs et al. |
| 2007/0282766 A1 | 12/2007 | Hartman et al. |
| 2008/0022259 A1 | 1/2008 | Macklem et al. |
| 2008/0092131 A1 | 4/2008 | Mcintyre et al. |
| 2008/0163344 A1 | 7/2008 | Yang |
| 2008/0235166 A1 | 9/2008 | Sayyar-Rodsari et al. |
| 2008/0288931 A1 | 11/2008 | Kohli |
| 2009/0064103 A1 | 3/2009 | Shih |
| 2009/0083649 A1 | 3/2009 | Baier et al. |
| 2009/0088875 A1 | 4/2009 | Baier et al. |
| 2009/0089225 A1 | 4/2009 | Baier et al. |
| 2009/0089234 A1 | 4/2009 | Sturrock et al. |
| 2009/0276752 A1 | 11/2009 | Sharma |
| 2010/0082133 A1 | 4/2010 | Chouinard et al. |
| 2010/0241891 A1 | 9/2010 | Beasley |
| 2010/0269094 A1 | 10/2010 | Levenshteyn et al. |
| 2010/0293481 A1 | 11/2010 | Austin |
| 2011/0239198 A1 | 9/2011 | Sweis |
| 2012/0109590 A1 | 5/2012 | Trainer et al. |
| 2012/0212484 A1 | 8/2012 | Haddick et al. |
| 2013/0123946 A1 | 5/2013 | Govindaraj et al. |
| 2013/0212214 A1 | 8/2013 | Lawson et al. |
| 2013/0218867 A1 | 8/2013 | DeLuca et al. |
| 2013/0332212 A1 | 12/2013 | Cohen |
| 2014/0013313 A1 | 1/2014 | Eker et al. |
| 2014/0047413 A1 | 2/2014 | Sheive et al. |
| 2014/0096108 A1 | 4/2014 | Austin |
| 2014/0130020 A1 | 5/2014 | Boshernitsan et al. |
| 2014/0229389 A1 | 8/2014 | Pantaleano et al. |
| 2014/0337277 A1 | 11/2014 | Asenjo et al. |
| 2014/0359586 A1 | 12/2014 | Payette et al. |
| 2015/0180734 A1 | 6/2015 | Maes et al. |
| 2015/0186119 A1 | 7/2015 | Chouinard et al. |
| 2015/0248845 A1 | 9/2015 | Postlethwaite et al. |
| 2016/0140930 A1 | 5/2016 | Pusch et al. |
| 2016/0274552 A1 | 9/2016 | Strohmenger et al. |
| 2016/0282853 A1 | 9/2016 | Michalscheck et al. |
| 2016/0284128 A1 | 9/2016 | Michalscheck et al. |
| 2016/0291566 A1 | 10/2016 | Prosak et al. |
| 2016/0330082 A1 | 11/2016 | Bliss et al. |
| 2016/0364675 A1 | 12/2016 | Sharma et al. |
| 2017/0103440 A1 | 4/2017 | Xing et al. |
| 2017/0206237 A1 | 7/2017 | Sokol et al. |
| 2017/0308052 A1 | 10/2017 | Kajiyama |
| 2017/0329687 A1 | 11/2017 | Chorley et al. |
| 2017/0336947 A1 | 11/2017 | Bliss et al. |
| 2017/0357565 A1 | 12/2017 | Ledet |
| 2018/0025286 A1 | 1/2018 | Gorelik et al. |
| 2018/0039905 A1 | 2/2018 | Anghel et al. |
| 2018/0052451 A1 | 2/2018 | Billi-Duran et al. |
| 2018/0083982 A1 | 3/2018 | Asenjo et al. |
| 2018/0129276 A1 | 5/2018 | Nguyen et al. |
| 2018/0130260 A1 | 5/2018 | Schmirler et al. |
| 2018/0131907 A1 | 5/2018 | Schmirler et al. |
| 2018/0136910 A1 | 5/2018 | Noetzelmann et al. |
| 2018/0169517 A1 | 6/2018 | Balest |
| 2018/0188715 A1 | 7/2018 | Cella et al. |
| 2018/0192075 A1 | 7/2018 | Chambers et al. |
| 2018/0197347 A1 | 7/2018 | Tomizuka |
| 2018/0246803 A1 | 8/2018 | Zhang |
| 2018/0267496 A1 | 9/2018 | Wang et al. |
| 2018/0299863 A1 | 10/2018 | Caine et al. |
| 2018/0307311 A1 | 10/2018 | Webb et al. |
| 2018/0342106 A1 | 11/2018 | Rosado |
| 2018/0357922 A1 | 12/2018 | Dutta et al. |
| 2018/0373885 A1 | 12/2018 | Arad et al. |
| 2019/0012151 A1 | 1/2019 | Holbrook et al. |
| 2019/0057548 A1 | 2/2019 | Singh et al. |
| 2019/0079643 A1 | 3/2019 | Kershaw et al. |
| 2019/0079740 A1 | 3/2019 | Sharma et al. |
| 2019/0129181 A1 | 5/2019 | Polcak et al. |
| 2019/0146577 A1 | 5/2019 | Rokade et al. |
| 2019/0147655 A1 | 5/2019 | Galera et al. |
| 2019/0171187 A1 | 6/2019 | Cella et al. |
| 2019/0188108 A1 | 6/2019 | Jagannathan |
| 2019/0205113 A1 | 7/2019 | Karpoff et al. |
| 2019/0220253 A1 | 7/2019 | Pradhan et al. |
| 2019/0279132 A1 | 9/2019 | Escriche et al. |
| 2019/0279424 A1 | 9/2019 | Clausen et al. |
| 2019/0325660 A1 | 10/2019 | Schmirler et al. |
| 2019/0385342 A1 | 12/2019 | Freeman et al. |
| 2020/0019147 A1 | 1/2020 | Ludwig et al. |
| 2020/0019493 A1 | 1/2020 | Ramakrishna et al. |
| 2020/0150638 A1 | 5/2020 | Mourzine et al. |
| 2020/0175395 A1 | 6/2020 | Kathiresan et al. |
| 2020/0285462 A1 | 9/2020 | Sabath et al. |
| 2020/0371665 A1 | 11/2020 | Clausen et al. |
| 2021/0011712 A1 | 1/2021 | Grant et al. |
| 2021/0089276 A1 | 3/2021 | Dunn et al. |
| 2021/0089278 A1 | 3/2021 | Dunn et al. |

(56) References Cited

U.S. PATENT DOCUMENTS

| | | | |
|---|---|---|---|
| 2021/0096526 | A1 | 4/2021 | Ericsson et al. |
| 2021/0096704 | A1 | 4/2021 | Ericsson et al. |
| 2021/0096827 | A1 | 4/2021 | Stump et al. |
| 2021/0294307 | A1 | 9/2021 | Onteddu et al. |
| 2021/0327303 | A1 | 10/2021 | Buras et al. |
| 2021/0327304 | A1 | 10/2021 | Buras et al. |
| 2021/0397166 | A1 | 12/2021 | SayyarRodsari et al. |
| 2021/0397171 | A1 | 12/2021 | SayyarRodsari et al. |

FOREIGN PATENT DOCUMENTS

| | | |
|---|---|---|
| CN | 108829024 A | 11/2018 |
| CN | 208314755 U | 1/2019 |
| CN | 109765836 A | 5/2019 |
| CN | 109840085 A | 6/2019 |
| EP | 1 256 861 A1 | 11/2002 |
| EP | 1 296 232 A2 | 3/2003 |
| EP | 2 177 986 A1 | 4/2010 |
| EP | 2801939 A1 | 11/2014 |
| EP | 3 101 565 A1 | 7/2016 |
| EP | 3 070 548 A2 | 9/2016 |
| EP | 3 318 944 A2 | 5/2018 |
| EP | 3 376 325 A1 | 9/2018 |
| EP | 3 511 820 A1 | 7/2019 |
| EP | 3 798 768 A2 | 3/2021 |
| WO | 2008/115644 A1 | 9/2008 |
| WO | 2014/092694 A1 | 6/2014 |
| WO | 2016/053337 A1 | 4/2016 |
| WO | 2016/195690 A1 | 12/2016 |
| WO | 2019/136754 A1 | 7/2019 |

OTHER PUBLICATIONS

Non-Final office action received for U.S. Appl. No. 17/340,931 dated Oct. 12, 2022, 108 Pages.
Non-Final office action received for U.S. Appl. No. 17/340,861 dated Oct. 7, 2022, 102 Pages.
Non-Final office action received for U.S. Appl. No. 17/692,454 dated Oct. 13, 2022, 46 Pages.
Notice of Allowance received for U.S. Appl. No. 17/340,861 dated Dec. 30, 2022, 105 pages.
Notice of Allowance received for U.S. Appl. No. 17/692,454 dated Jan. 19, 2023, 18 pages.
Communication pursuant to Article 94(3) EPC received for European Patent Application Serial No. 20166284.8 dated Oct. 14, 2022, 6 pages.
Communication pursuant to Article 94(3) EPC received for European Patent Application Serial No. 20166776.3 dated Nov. 23, 2022, 7 pages.
Communication pursuant to Article 94(3) EPC received for European Patent Application Serial No. 21165314.2 dated Dec. 23, 2022, 6 pages.
Notice of Allowance received for U.S. Appl. No. 17/340,931 dated Jan. 24, 2023, 248 pages.
Notice of Allowance received for U.S. Appl. No. 17/340,861 dated Feb. 2, 2023, 6 pages.
Notice of Allowance received for U.S. Appl. No. 17/570,552 dated Feb. 3, 2023, 68 pages.
Notice of Allowance received for U.S. Appl. No. 17/570,552 dated Feb. 15, 2023, 9 pages.
Notice of Allowance received for U.S. Appl. No. 17/692,454 dated Feb. 1, 2023, 6 pages.
Communication pursuant to Article 94(3) EPC received for European Patent Application Serial No. 20166772.2 dated Mar. 10, 2023, 6 pages.
Decision to grant a European patent pursuant to Article 97(1) EPC received for European Patent Application Serial No. 20166680.7 dated Nov. 4, 2022, 2 pages.
Notice of Allowance received for U.S. Appl. No. 16/584,415 dated Mar. 15, 2023, 73 pages.

Non-Final office action received for U.S. Appl. No. 17/842,871 dated Mar. 28, 2023, 106 Pages.
Notice of Allowance received for U.S. Appl. No. 16/584,415 dated Mar. 31, 2023, 6 pages.
Notice of Allowance received for U.S. Appl. No. 17/570,552 dated Mar. 27, 2023, 6 pages.
Notice of Allowance received for U.S. Appl. No. 17/692,454 dated Mar. 31, 2023, 8 pages.
Notice of Allowance received for U.S. Appl. No. 17/340,931 dated Mar. 29, 2023, 8 pages.
U.S. Appl. No. 17/340,861, filed Jun. 7, 2021.
U.S. Appl. No. 16/584,298, filed Sep. 26, 2019.
Extended European Search Report received for EP Patent Application Serial No. 20167073.4 dated May 28, 2020, 11 pages.
Iriondo et al., "Automatic Generation of the Supervisor Code for Industrial Switched-Mode Systems", IEEE Transactions on Industrial Informatics, IEEE Service Center, vol. 9, No. 4, Nov. 1, 2013, pp. 1868-1878.
Wikipedia, "Semi-supervised learning", URL: https://en.wikipedia.org/w/index.php?title=Semi-supervised learning&oldid=900515496, Jun. 6, 2019, pp. 1-7.
Non-final office action received for U.S. Appl. No. 16/580,672 dated Oct. 1, 2020, 106 Pages.
Grundy et al.; "Generating Domain-Specific Visual Language Tools from Abstract Visual Specifications"; IEEE Transactions on Software Engineering, vol. 39, No. 4 (pp. 487-515); Apr. 2013 (Year: 2013).
Salihbegovic et al.; "Design of a Domain Specific Language and IDE for Internet of Things Applications"; 38th International Convention on Information and Communication Technology, Electronics and Microelectronics (MIPRO) (pp. 996-1001); 2015 (Year:2015).
Schmitt et al.; "An Evaluation of Domain-Specific Language Technologies for Code Generation"; 14th International Conference on Computational Science and Its Applications (pp. 18-26); 2014 (Year: 2014).
Dwarakanath et al.; "Accelerating Test Automation Through a Domain Specific Language"; IEEE International Conference on Software Testing, Verification and Validation (ICST) (pp. 460-467); 2017 (Year: 2017).
Preuer, Stefan; "A Domain-Specific Language for Industrial Automation"; Software Engineering 2007-Beitrage zu den Workshops-Fachtagung des GI-Fachbereichs Softwaretechnik. Gesellschaft fi.ir Informatik e. V., 2007 (Year: 2007).
Vyatkin, Valeriy; "Software Engineering in Industrial Automation: State-of-the-Art Review"; IEEE Transactions on Industrial Informatics 9.3: (pp. 1234-1249); 2013 (Year: 2013).
"NetBeans IDE"; Netbeans.org website [full url in ref.]; Oct. 1, 2012 (Year: 2012).
Notice of allowance received for U.S. Appl. No. 16/580,672 dated Oct. 30, 2020, 23 Pages.
Non-final office action received for U.S. Appl. No. 16/580,581 dated Oct. 20, 2020, 51 Pages.
Non final office action received for U.S. Appl. No. 16/584,298 dated Oct. 20, 2020, 63 Pages.
Non-final office action received for U.S. Appl. No. 16/584,368 dated Nov. 18, 2020, 44 Pages.
Non final office action received for U.S. Appl. No. 16/584,470 dated Feb. 18, 2021, 46 Pages.
Extended European Search Report for European Application No. 20166286.3 1224, dated Jan. 29, 2021, 12 pages.
Eclipse: "Using JavaScript Syntax Coloring," Mar. 5, 2019. Retrieved from internet Jan. 20, 2021. https://web.archive.org/web/20190305182138/http://www.eclipse.org:80/pdUhelp/html/using_javascript_syntax_coloring.htm.
Extended European Search Report received for European Patent Application No. 20166776.3-1202, dated Feb. 24, 2021, 10 pages.
Extended European Search Report received for European Patent Application No. 20167085.8-1224, dated Feb. 5, 2021, 8 Pages.
European Search Report for European patent Application No. 20166772.2 1202, dated Feb. 3, 2021, 17 pages.
Extended European Search Report received for European Application No. 20166680.7, dated Jan. 22, 2021, 10 pages.

(56) References Cited

OTHER PUBLICATIONS

Extended European search report received for European Patent Application No. 20166772.2, dated Apr. 23, 2021, 15 pages.
Extended European search report received for European Application No. 20166284.8, dated Feb. 17, 2021, 08 pages.
Communication pursuant to Rule 69 EPC received for European Patent Application Serial No. 20166284.8 dated Apr. 7, 2021, 2 pages.
Communication pursuant to Rule 69 EPC received for European Patent Application Serial No. 20167085.8 dated Apr. 7, 2021, 2 pages.
Communication pursuant to Rule 69 EPC received for European Patent Application Serial No. 20166680.7 dated Apr. 7, 2021, 2 pages.
Communication pursuant to Rule 69 EPC received for European Patent Application Serial No. 20167073.4 dated Apr. 7, 2021, 2 pages.
Communication pursuant to Rule 69 EPC received for European Patent Application Serial No. 20166776.3 dated Apr. 7, 2021, 2 pages.
Communication pursuant to Rule 69 EPC received for European Patent Application Serial No. 20166286.3 dated Apr. 7, 2021, 2 pages.
Non final office action received for U.S. Appl. No. 16/584,210 dated Aug. 30, 2021, 60 Pages.
Communication pursuant to Rule 69 EPC received for European Patent Application Serial No. 20166772.2 dated May 31, 2021, 2 pages.
Non final office action received for U.S. Appl. No. 16/838,330 dated Aug. 5, 2021, 56 Pages.
Notice of Allowance received for U.S. Appl. No. 17/157,185 dated Nov. 1, 2021, 51 Pages.
Notice of Allowance received for U.S. Appl. No. 16/838,330 dated Dec. 20, 2021, 78 Pages.
Ewenike, S., et al., Cloud Based Collaborative Software Development: A Review, Gap Analysis and Future Directions, 2017 IEEE/ACS 14th International Conference on Computer Systems and Applications, pp. 901-909, 2017, [retrieved on Nov. 26, 2021], Retrieved from the Internet: <URL:http://ieeexplore.ieee.org/>.
Figueiredo, M., et al., Wolf: Supporting Impact Analysis Activities in Distributed Software Development, 2012 5th International Workshop on Co-operative and Human Aspects of Software Engineering (CHASE), pp. 40-46, Jun. 2012, [retrieved on Nov. 26, 2021], Retrieved from the Internet: <URL:http://ieeexplore.ieee.org/>.
Communication pursuant to Article 94(3) EPC received for European Patent Application Serial No. 20167073.4 dated Oct. 27, 2021, 9 pages.
Communication pursuant to Rule 69 EPC received for European Patent Application Serial No. 20166680.7 dated Nov. 30, 2021, 3 pages.
Extended European Search Report received for European Patent Application Serial No. 21165314.2 dated Aug. 18, 2021, 13 pages.
Communication pursuant to Rule 69 EPC received European Patent Application Serial No. 21165314.2 dated Oct. 11, 2021, 2 pages.
Notice of Allowance received for U.S. Appl. No. 16/584,210 dated Mar. 21, 2022, 112 pages.
Zhang et al., "Design and Interaction Interface Using Augmented Reality for Smart Manufacturing", Procedia Manufacturing, vol. 26, 2018, pp. 1278-1286.
Rabah et al., "Towards Improving the Future of Manufacturing Through Digital Twin and Augmented Reality Technologies", Procedia Manufacturing, vol. 17, 2018, pp. 460-467.
Havard et al., "Digital Twin and Virtual Reality: a Co-simulation Environment for Design and Assessment of Industrial Workstations", Production & Manufacturing Research, vol. 7, No. 1, 2019, pp. 472-489.
Grajewski et al., "Application of Virtual Reality Techniques in Design of Ergonomic Manufacturing Workplaces", Procedia Computer Science, vol. 25, 2013, pp. 289-301.
Zaldevar-Colado et al., "Mixed Reality for Virtual Assembly", 26th IEEE International Symposium on Robot and Human Interactive Communication (RO-MAN), 2017, pp. 739-744.
Coburn et al., "A Review of the Capabilities of Current Low-Cost Virtual Reality Technology and its Potential to Enhance the Design Process", Journal of Computing and Information Science in Engineering, vol. 17, Sep. 2017, pp. 031013-1-031013-1-15.
Communication pursuant to Article 94(3) EPC received for E.P Patent Application Serial No. 20166286.3 dated Jul. 6, 2022, 5 pages.
Communication pursuant to Article 94(3) EPC received for E.P Patent Application Serial No. 20167073.4 dated Aug. 11, 2022, 8 pages.
Notice of Allowance received for U.S. Appl. No. 17/842,871 dated Sep. 13, 2023, 154 pages.
Weyrich et al., "An Interactive Environment for Virtual Manufacturing: The Virtual Workbench", Computers in Industry, vol. 38, 1999, 11 pages.
Mujber et al., "Virtual Reality Applications in Manufacturing Process Simulation", Journal of Materials Processing Technology, vol. 155-156, 2004, 5 pages.
Tuma et al., "The Process Simulation using by Virtual Reality", Procedia Engineering, vol. 69, 2014, 6 pages.
Rodriguez et al., "Developing a Mixed Reality Assistance System based on Projection Mapping Technology for Manual Operations at Assembly Workstations", Procedia Computer Science, vol. 75, 2015, 7 pages.
Dorozhkin et al., "Coupling of Interactive Manufacturing Operations Simulation and Immersive Virtual Reality", Virtual Reality, vol. 16, 2010, 14 pages.
Notice of Allowance received for U.S. Appl. No. 16/584,415 dated Jul. 21, 2023, 12 pages.
Non-Final office action received for U.S. Appl. No. 17/471,544 dated Aug. 30, 2023, 89 pages.
Communication pursuant to Article 94(3) EPC received for EP Patent Application Serial No. 20166286.3 dated Jul. 27, 2023, 8 pages.
Office Action received for Chinese Patent Application Serial No. 202010236312.8 dated Aug. 31, 2023, 8 pages (English Translation Only).

INDUSTRIAL PROGRAMMING DEVELOPMENT WITH A CONVERTED INDUSTRIAL CONTROL PROGRAM

CROSS-REFERENCE TO RELATED APPLICATIONS

This application is a continuation of, and claims priority to, U.S. patent application Ser. No. 17/340,861 (now U.S. Pat. No. 11,640,566), filed on Jun. 7, 2021, and entitled "INDUSTRIAL PROGRAMMING DEVELOPMENT WITH A CONVERTED INDUSTRIAL CONTROL PROGRAM," which is a continuation of U.S. patent application Ser. No. 16/584,298 (now U.S. Pat. No. 11,042,362), filed on Sep. 26, 2019, and entitled "INDUSTRIAL PROGRAMMING DEVELOPMENT WITH A TRAINED ANALYTIC MODEL." The entireties of these related applications are incorporated herein by reference.

BACKGROUND

The subject matter disclosed herein relates generally to industrial automation systems, and, for example, to industrial programming development platforms

BRIEF DESCRIPTION

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

In one or more embodiments, a system for developing industrial applications is provided, comprising a user interface component configured to render integrated development environment (IDE) interfaces and to receive, via interaction with the IDE interfaces, industrial design input that specifies aspects of an industrial automation control project; a project generation component configured to perform an analysis on the industrial design input based on an analytic model and to generate system project data based on inferences about the industrial design input determined based on results of the analysis; and a training component configured to train the analytic module based on training analysis performed on aggregated system project data collected by the system from multiple sets of system project data.

Also, one or more embodiments provide a method for creating industrial applications, comprising rendering, by a system comprising a processor, integrated development environment (IDE) interfaces on a client device; receiving, by the system via interaction with the IDE interfaces, industrial design input that defines aspects of an industrial control and monitoring project; analyzing, by the system, the industrial design input based on an analytic model; generating, by the system, system project data based on inferences about the industrial design input determined based on results of the analyzing; performing, by the system, training analysis on aggregated system project data collected from multiple sets of system project data including the system project data; and training, by the system, the analytic module based on results of the training analysis.

Also, according to one or more embodiments, a non-transitory computer-readable medium is provided having stored thereon instructions that, in response to execution, cause a system to perform operations, the operations comprising rendering integrated development environment (IDE) interfaces on a client device; receiving, from the client device via interaction with the IDE interfaces, industrial design input that defines control design aspects of an industrial automation project; analyzing the industrial design input using an analytic model; generating system project data based on inferences about the industrial design input learned based on results of the analyzing; performing training analysis on aggregated system project data collected from multiple sets of system project data including the system project data; and training the analytic module based on results of the training analysis.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
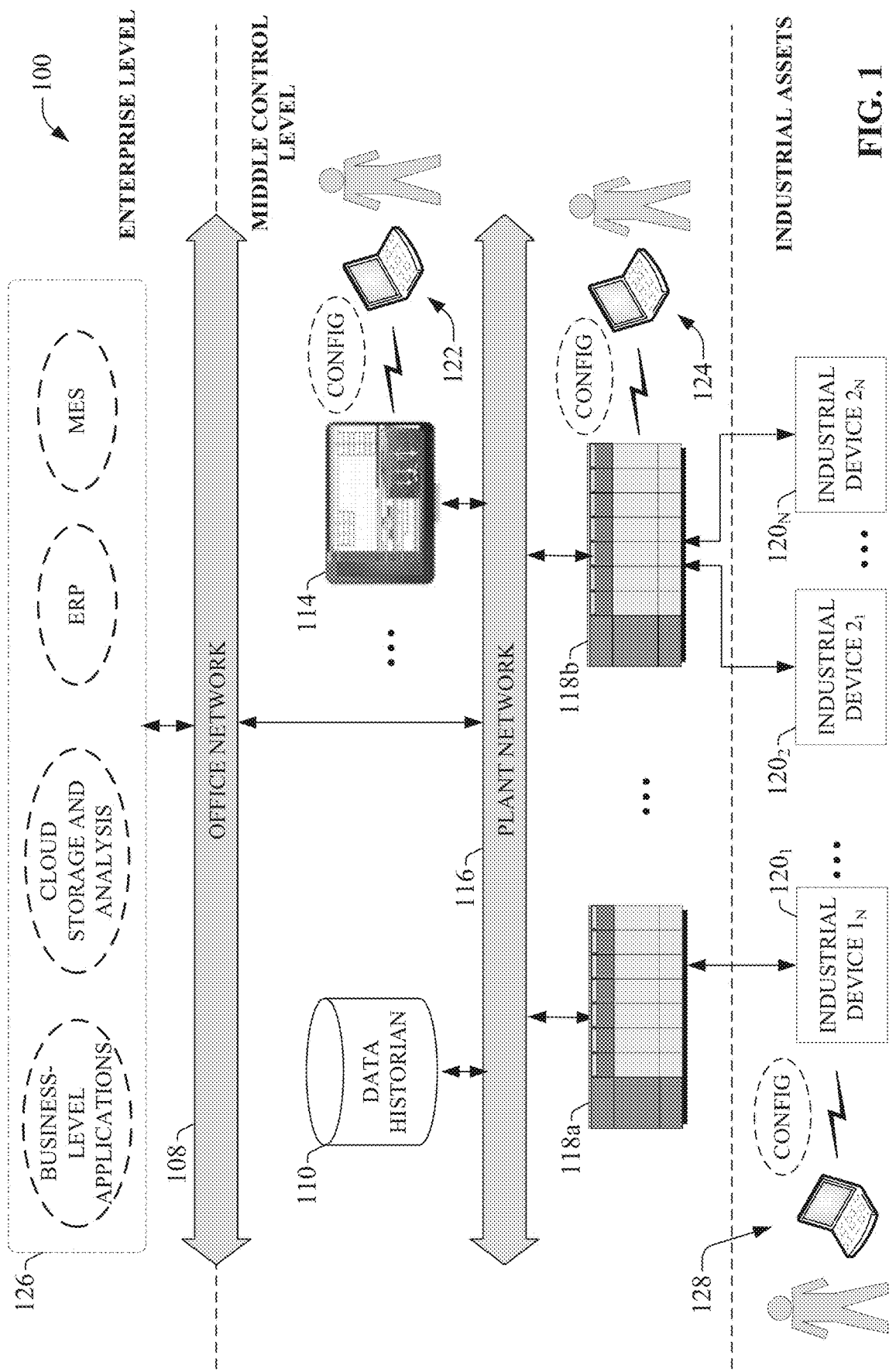
FIG. 1 is a block diagram of an example industrial control environment.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

FIG. 1 is a block diagram of an example industrial control environment 100. In this example, a number of industrial controllers 118 are deployed throughout an industrial plant environment to monitor and control respective industrial systems or processes relating to product manufacture, machining, motion control, batch processing, material handling, or other such industrial functions. Industrial controllers 118 typically execute respective control programs to facilitate monitoring and control of industrial devices 120 making up the controlled industrial assets or systems (e.g., industrial machines). One or more industrial controllers 118 may also comprise a soft controller executed on a personal computer or other hardware platform, or on a cloud platform. Some hybrid devices may also combine controller functionality with other functions (e.g., visualization). The control programs executed by industrial controllers 118 can comprise substantially any type of code capable of processing input signals read from the industrial devices 120 and controlling output signals generated by the industrial controllers 118, including but not limited to ladder logic, sequential function charts, function block diagrams, or structured text.

Industrial devices 120 may include both input devices that provide data relating to the controlled industrial systems to the industrial controllers 118, and output devices that respond to control signals generated by the industrial controllers 118 to control aspects of the industrial systems. Example input devices can include telemetry devices (e.g., temperature sensors, flow meters, level sensors, pressure sensors, etc.), manual operator control devices (e.g., push buttons, selector switches, etc.), safety monitoring devices (e.g., safety mats, safety pull cords, light curtains, etc.), and other such devices. Output devices may include motor drives, pneumatic actuators, signaling devices, robot control inputs, valves, pumps, and the like.

Industrial controllers 118 may communicatively interface with industrial devices 120 over hardwired or networked connections. For example, industrial controllers 118 can be equipped with native hardwired inputs and outputs that communicate with the industrial devices 120 to effect control of the devices. The native controller I/O can include digital I/O that transmits and receives discrete voltage signals to and from the field devices, or analog I/O that transmits and receives analog voltage or current signals to and from the devices. The controller I/O can communicate with a controller's processor over a backplane such that the digital and analog signals can be read into and controlled by the control programs. Industrial controllers 118 can also communicate with industrial devices 120 over a network using, for example, a communication module or an integrated networking port. Exemplary networks can include the Internet, intranets, Ethernet, DeviceNet, ControlNet, Data Highway and Data Highway Plus (DH/DH+), Remote I/O, Fieldbus, Modbus, Profibus, wireless networks, serial protocols, and the like. The industrial controllers 118 can also store persisted data values that can be referenced by their associated control programs and used for control decisions, including but not limited to measured or calculated values representing operational states of a controlled machine or process (e.g., tank levels, positions, alarms, etc.) or captured time series data that is collected during operation of the automation system (e.g., status information for multiple points in time, diagnostic occurrences, etc.). Similarly, some intelligent devices—including but not limited to motor drives, instruments, or condition monitoring modules—may store data values that are used for control and/or to visualize states of operation. Such devices may also capture time-series data or events on a log for later retrieval and viewing.

Industrial automation systems often include one or more human-machine interfaces (HMIs) 114 that allow plant personnel to view telemetry and status data associated with the automation systems, and to control some aspects of system operation. HMIs 114 may communicate with one or more of the industrial controllers 118 over a plant network 116, and exchange data with the industrial controllers to facilitate visualization of information relating to the controlled industrial processes on one or more pre-developed operator interface screens. HMIs 114 can also be configured to allow operators to submit data to specified data tags or memory addresses of the industrial controllers 118, thereby providing a means for operators to issue commands to the controlled systems (e.g., cycle start commands, device actuation commands, etc.), to modify setpoint values, etc. HMIs 114 can generate one or more display screens through which the operator interacts with the industrial controllers 118, and thereby with the controlled processes and/or systems. Example display screens can visualize present states of industrial systems or their associated devices using graphical representations of the processes that display metered or calculated values, employ color or position animations based on state, render alarm notifications, or employ other such techniques for presenting relevant data to the operator. Data presented in this manner is read from industrial controllers 118 by HMIs 114 and presented on one or more of the display screens according to display formats chosen by the HMI developer. HMIs may comprise fixed location or mobile devices with either user-installed or pre-installed operating systems, and either user-installed or pre-installed graphical application software.

Some industrial environments may also include other systems or devices relating to specific aspects of the controlled industrial systems. These may include, for example, a data historian 110 that aggregates and stores production information collected from the industrial controllers 118 or other data sources, device documentation stores containing electronic documentation for the various industrial devices making up the controlled industrial systems, inventory tracking systems, work order management systems, repositories for machine or process drawings and documentation, vendor product documentation storage, vendor knowledgebases, internal knowledgebases, work scheduling applications, or other such systems, some or all of which may reside on an office network 108 of the industrial environment.

Higher-level systems 126 may carry out functions that are less directly related to control of the industrial automation systems on the plant floor, and instead are directed to long term planning, high-level supervisory control, analytics, reporting, or other such high-level functions. These systems 126 may reside on the office network 108 at an external location relative to the plant facility, or on a cloud platform with access to the office and/or plant networks. Higher-level systems 126 may include, but are not limited to, cloud storage and analysis systems, big data analysis systems, manufacturing execution systems, data lakes, reporting systems, etc. In some scenarios, applications running at these higher levels of the enterprise may be configured to analyze control system operational data, and the results of this analysis may be fed back to an operator at the control system or directly to a controller 118 or device 120 in the control system.

The various control, monitoring, and analytical devices that make up an industrial environment must be programmed or configured using respective configuration applications specific to each device. For example, industrial controllers 118 are typically configured and programmed using a control programming development application such as a ladder logic editor (e.g., executing on a client device 124). Using such development platforms, a designer can write control programming (e.g., ladder logic, structured text, function block diagrams, etc.) for carrying out a desired industrial sequence or process and download the resulting program files to the controller 118. Separately, developers design visualization screens and associated navigation structures for HMIs 114 using an HMI development platform (e.g., executing on client device 122) and download the resulting visualization files to the HMI 114. Some industrial devices 120—such as motor drives, telemetry devices, safety input devices, etc.—may also require configuration using separate device configuration tools (e.g., executing on client device 128) that are specific to the device being configured. Such device configuration tools may be used to set device parameters or operating modes (e.g., high/low limits, output signal formats, scale factors, energy consumption modes, etc.).

The necessity of using separate configuration tools to program and configure disparate aspects of an industrial automation system results in a piecemeal design approach whereby different but related or overlapping aspects of an automation system are designed, configured, and programmed separately on different development environments. For example, a motion control system may require an industrial controller to be programmed and a control loop to be tuned using a control logic programming platform, a motor drive to be configured using another configuration platform, and an associated HMI to be programmed using a visualization development platform. Related peripheral systems—such as vision systems, safety systems, etc.—may also require configuration using separate programming or development applications.

This segregated development approach can also necessitate considerable testing and debugging efforts to ensure proper integration of the separately configured system aspects. In this regard, intended data interfacing or coordinated actions between the different system aspects may require significant debugging due to a failure to properly coordinate disparate programming efforts.

To address at least some of these or other issues, one or more embodiments described herein provide an integrated development environment (IDE) for designing, programming, and configuring multiple aspects of an industrial automation system using a common design environment and data model. Embodiments of the industrial IDE can be used to configure and manage automation system devices in a common way, facilitating integrated, multi-discipline programming of control, visualization, and other aspects of the control system.

In general, the industrial IDE supports features that span the full automation lifecycle, including design (e.g., device selection and sizing, controller programming, visualization development, device configuration, testing, etc.); installation, configuration and commissioning; operation, improvement, and administration; and troubleshooting, expanding, and upgrading.

Embodiments of the industrial IDE can include a library of modular code and visualizations that are specific to industry verticals and common industrial applications within those verticals. These code and visualization modules can simplify development and shorten the development cycle, while also supporting consistency and reuse across an industrial enterprise.

Some embodiments of the industrial IDE system can also include a training component that improves several of the system's automated design tools over time based on analysis of project data submitted by developers. For example, the IDE system can apply analytics (e.g., artificial intelligence, machine learning, etc.) to project data submitted by developers across multiple industrial enterprises to identify commonly used control code, visualizations, device configurations, or system architectures that are frequently used for a given industrial function, machine, or application. This learned information can be encoded in a training module, which can be leveraged by the IDE system to generate recommendations regarding control programming, suitable visualizations, device parameter configurations, control system architectures, or other automation system aspects. The IDE system can also automatically add suitable control code, visualizations, device parameter settings or configurations, engineering drawings, or other such project aspects to new control projects being developed based on an inference of the developer's design goals and knowledge of how these goals have been implemented by other developers.

Some embodiments of the IDE system can also be configured to convert legacy control programs to a new format supported by the IDE system and supporting industrial devices. These control project conversions can be performed based in part on common approaches to implementing certain design goals learned by the training component and encoded in the trained analytic module.

Figure 2:
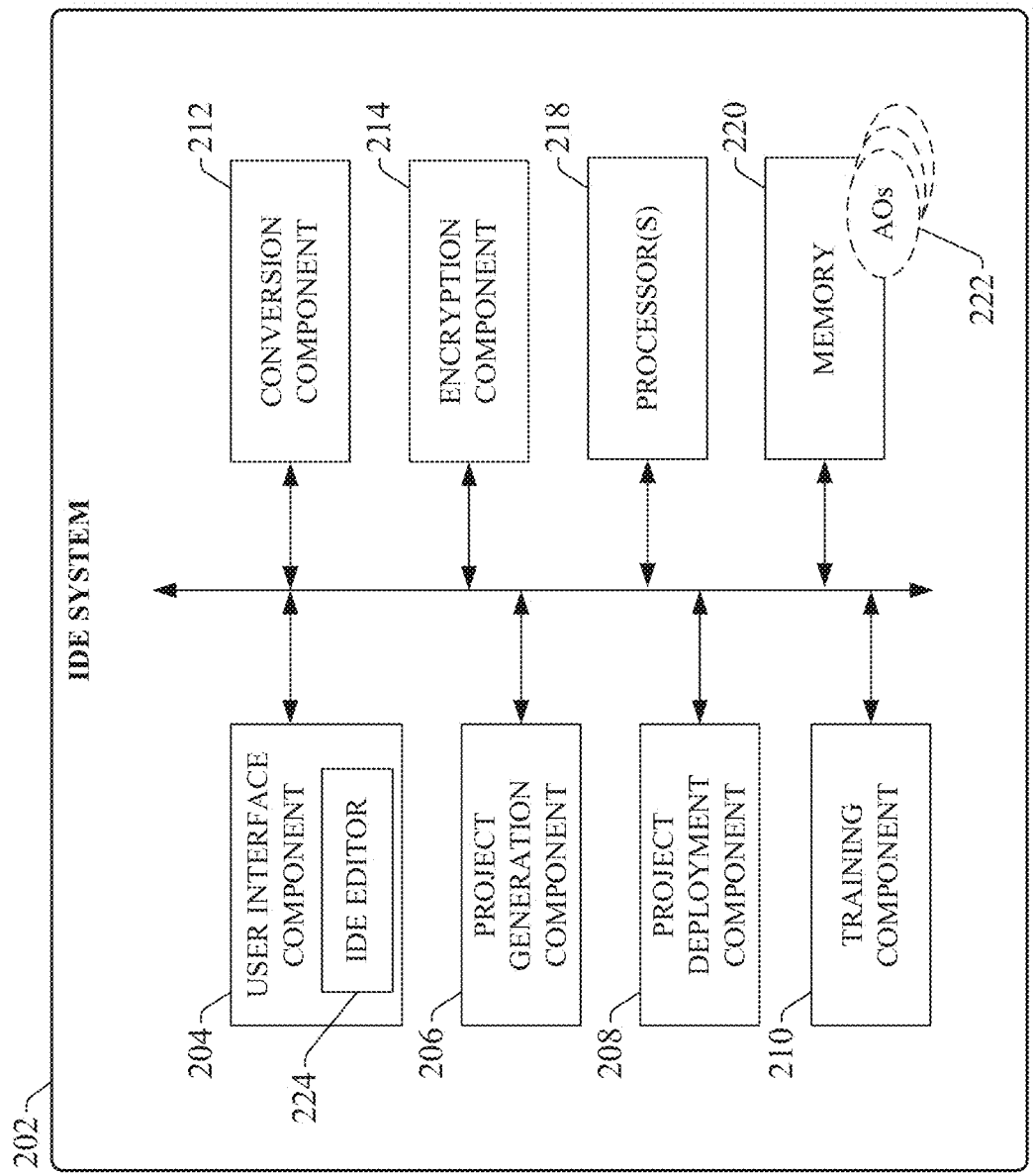
FIG. 2 is a block diagram of an example integrated development environment (IDE) system.

FIG. 2 is a block diagram of an example integrated development environment (IDE) system 202 according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

IDE system 202 can include a user interface component 204 including an IDE editor 224, a project generation component 206, a project deployment component 208, a training component 210, a conversion component 212, an encryption component 214, one or more processors 218, and memory 220. In various embodiments, one or more of the user interface component 204, project generation component 206, project deployment component 208, training component 210, conversion component 212, encryption component 214, the one or more processors 218, and memory 220 can be electrically and/or communicatively coupled to one another to perform one or more of the functions of the IDE system 202. In some embodiments, components 204, 206, 208, 210, 212, and 214 can comprise software instructions stored on memory 220 and executed by processor(s) 218. IDE system 202 may also interact with other hardware and/or software components not depicted in FIG. 2. For example, processor(s) 218 may interact with one or more external user interface devices, such as a keyboard, a mouse, a display monitor, a touchscreen, or other such interface devices.

User interface component 204 can be configured to receive user input and to render output to the user in any suitable format (e.g., visual, audio, tactile, etc.). In some embodiments, user interface component 204 can be configured to communicatively interface with an IDE client that executes on a client device (e.g., a laptop computer, tablet computer, smart phone, etc.) that is communicatively connected to the IDE system 202 (e.g., via a hardwired or wireless connection). The user interface component 204 can then receive user input data and render output data via the IDE client. In other embodiments, user interface component 314 can be configured to generate and serve suitable interface screens to a client device (e.g., program development screens), and exchange data via these interface screens. Input data that can be received via various embodiments of user interface component 204 can include, but is not limited to, programming code, industrial design specifications or goals, engineering drawings, AR/VR input, DSL definitions, video or image data, legacy control projects, or other such input. Output data rendered by various embodiments of user interface component 204 can include program code, programming feedback (e.g., error and highlighting, coding suggestions, etc.), programming and visualization development screens, etc.

Project generation component 206 can be configured to create a system project comprising one or more project files based on design input received via the user interface component 204, as well as industrial knowledge, predefined code modules and visualizations, and automation objects 222 maintained by the IDE system 202. Project generation component 206 can generate at least a portion of the system project based on a training module generated based on analysis of multiple sets of project data submitted to the industrial IDE system 202. Analysis of these multiple sets of project data trains the project generation component 206 to accurately convert design input submitted by the user to suitable control code, visualizations, device configurations, etc.

Project deployment component 208 can be configured to commission the system project created by the project generation component 206 to appropriate industrial devices (e.g., controllers, HMI terminals, motor drives, AR/VR systems, etc.) for execution. To this end, project deployment component 208 can identify the appropriate target devices to which respective portions of the system project should be sent for execution, translate these respective portions to formats understandable by the target devices, and deploy the translated project components to their corresponding devices.

Training component 210 can be configured to analyze multiple sets of project data submitted by developers in order to train the project generation component 206 to accurately convert design input submitted to the IDE system 202 to suitable executable project data (e.g., industrial controller programming, HMI applications or dashboards, device parameter settings, engineering drawings, etc.

Conversion component 212 an be configured to convert industrial control programming in a legacy format to an upgraded format supported by the IDE system 202. This can include, for example, mapping control segments discovered in the legacy control programming to automation objects, associated suitable visualizations with selected control segments, or other such conversion functions. Encryption component 214 can be configured to encrypt customer-specific project or design data for embodiments of the IDE system 202 that are embodied on a cloud platform as a cloud-based industrial design service.

The one or more processors 218 can perform one or more of the functions described herein with reference to the systems and/or methods disclosed. Memory 220 can be a computer-readable storage medium storing computer-executable instructions and/or information for performing the functions described herein with reference to the systems and/or methods disclosed.

Figure 3:
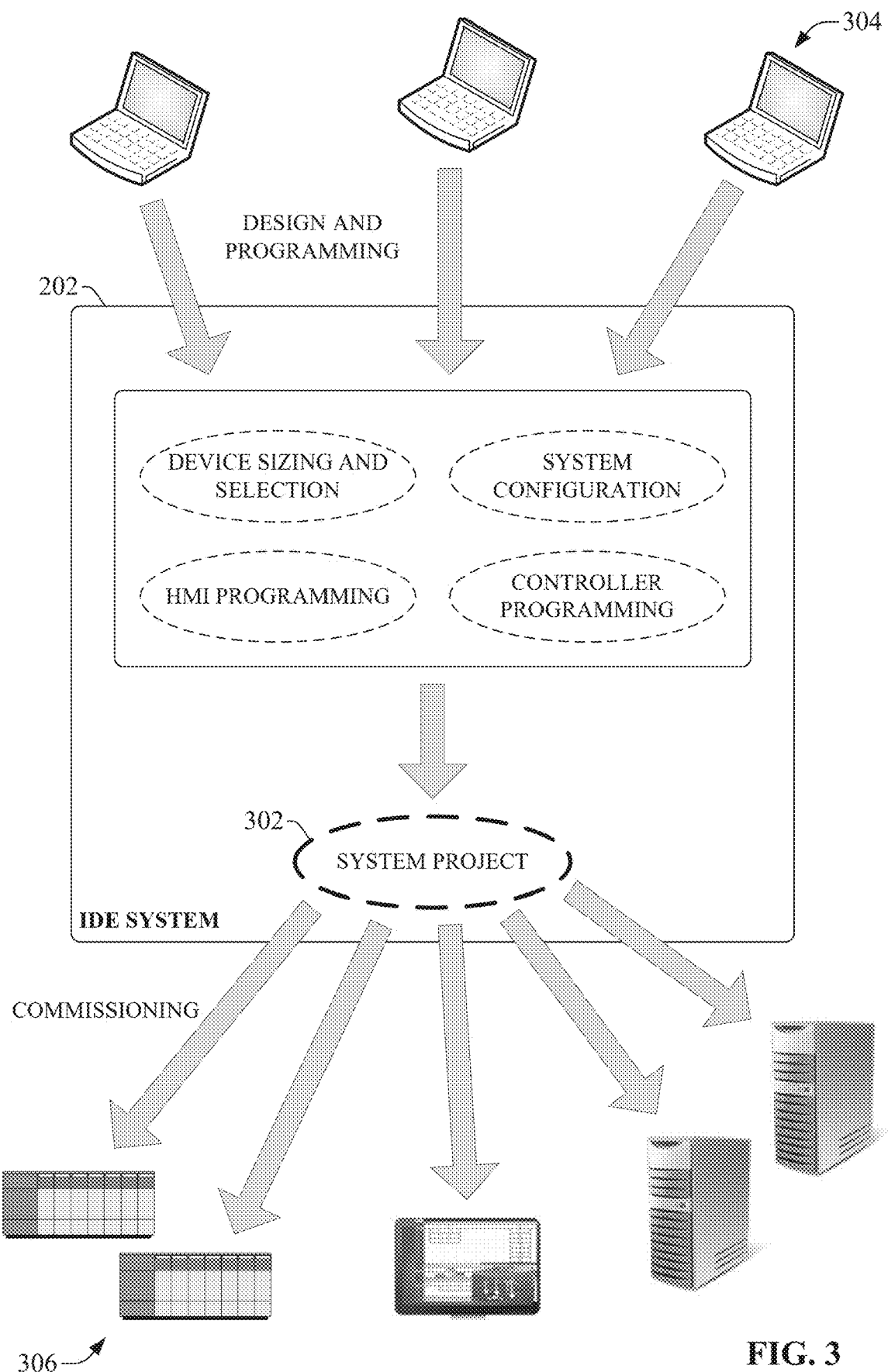
FIG. 3 is a diagram illustrating a generalized architecture of an industrial IDE system.

FIG. 3 is a diagram illustrating a generalized architecture of the industrial IDE system 202 according to one or more embodiments. Industrial IDE system 202 can implement a common set of services and workflows spanning not only design, but also commissioning, operation, and maintenance. In terms of design, the IDE system 202 can support not only industrial controller programming and HMI development, but also sizing and selection of system components, device/system configuration, AR/VR visualizations, and other features. The IDE system 202 can also include tools that simplify and automate commissioning of the resulting project and assist with subsequent administration of the deployed system during runtime.

Embodiments of the IDE system 202 that are implemented on a cloud platform also facilitate collaborative project development whereby multiple developers 304 contribute design and programming input to a common automation system project 302. Collaborative tools supported by the IDE system can manage design contributions from the multiple contributors and perform version control of the aggregate system project 302 to ensure project consistency.

Based on design and programming input from one or more developers 304, IDE system 202 generates a system project 302 comprising one or more project files. The system project 302 encodes one or more of control programming; HMI, AR, and/or VR visualizations; device or sub-system configuration data (e.g., drive parameters, vision system configurations, telemetry device parameters, safety zone definitions, etc.); or other such aspects of an industrial automation system being designed. IDE system 202 can identify the appropriate target devices 306 on which respective aspects of the system project 302 should be executed (e.g., industrial controllers, HMI terminals, variable frequency drives, safety devices, etc.), translate the system project 302 to executable files that can be executed on the respective target devices, and deploy the executable files to their corresponding target devices 306 for execution, thereby commissioning the system project 302 to the plant floor for implementation of the automation project.

Figure 4:
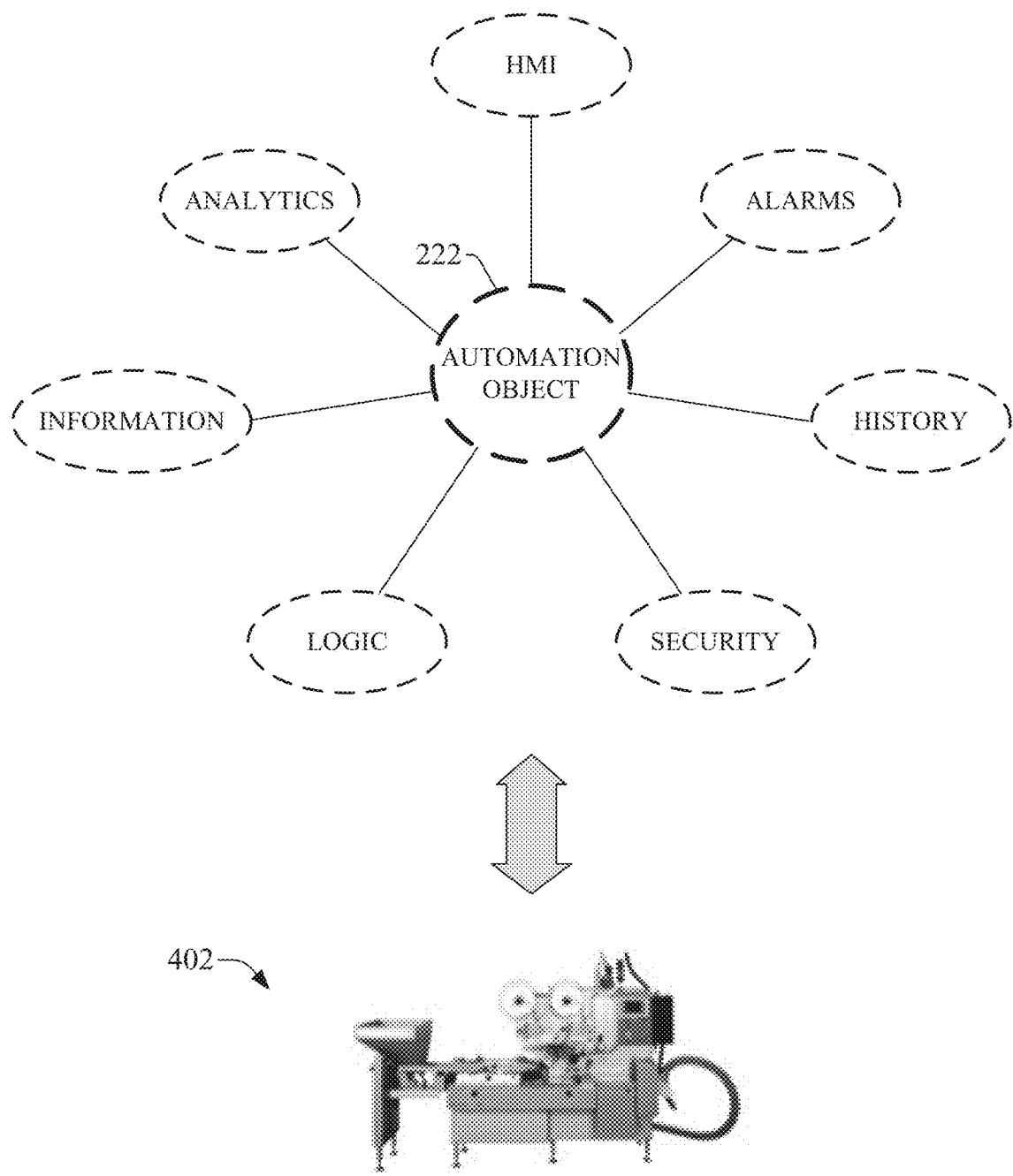
FIG. 4 is a diagram illustrating several example automation object properties that can be leveraged by the IDE system in connection with building, deploying, and executing a system project.

To support enhanced development capabilities, some embodiments of IDE system 202 can be built on an object-based data model rather than a tag-based architecture. Automation objects 222 serve as the building block for this object-based development architecture. FIG. 4 is a diagram illustrating several example automation object properties that can be leveraged by the IDE system 202 in connection with building, deploying, and executing a system project 302. Automation objects 222 can be created and augmented during design, integrated into larger data models, and consumed during runtime. These automation objects 222 provide a common data structure across the IDE system 202 and can be stored in an object library (e.g., part of memory 220) for reuse. The object library can store predefined automation objects 222 representing various classifications of real-world industrial assets 402, including but not limited to pumps, tanks, values, motors, motor drives (e.g., variable frequency drives), industrial robots, actuators (e.g., pneumatic or hydraulic actuators), or other such assets. Automation objects 222 can represent elements at substantially any level of an industrial enterprise, including individual devices, machines made up of many industrial devices and components (some of which may be associated with their own automation objects 222), and entire production lines or process control systems.

An automation object 222 for a given type of industrial asset can encode such aspects as 2D or 3D visualizations, alarms, control coding (e.g., logic or other type of control programming), analytics, startup procedures, testing protocols, validation reports, simulations, schematics, security protocols, and other such properties associated with the industrial asset 402 represented by the object 222. Automation objects 222 can also be geotagged with location information identifying the location of the associated asset. During runtime of the system project 302, the automation object 222 corresponding to a given real-world asset 402 can also record status or operational history data for the asset. In general, automation objects 222 serve as programmatic representations of their corresponding industrial assets 402, and can be incorporated into a system project 302 as elements of control code, a 2D or 3D visualization, a knowledgebase or maintenance guidance system for the industrial assets, or other such aspects.

Figure 5:
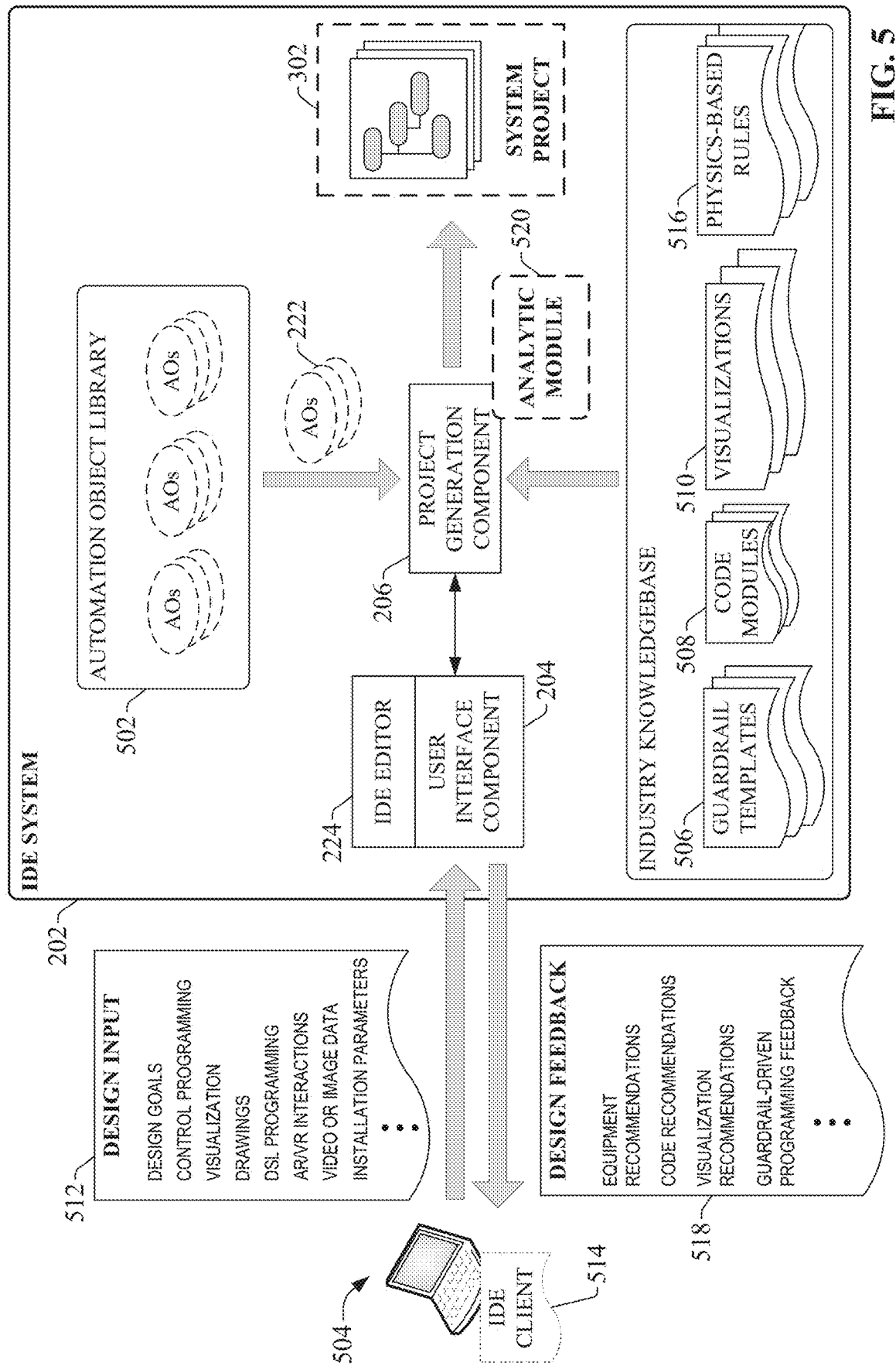
FIG. 5 is a diagram illustrating example data flows associated with creation of a system project for an automation system being designed using an industrial IDE system.

FIG. 5 is a diagram illustrating example data flows associated with creation of a system project 302 for an automation system being designed using IDE system 202 according to one or more embodiments. A client device 504 (e.g., a laptop computer, tablet computer, desktop computer, mobile device, wearable AR/VR appliance, etc.) executing an IDE client application 514 can access the IDE system's project development tools and leverage these tools to create a comprehensive system project 302 for an automation system being developed. Through interaction with the system's user interface component 204, developers can submit design input 512 to the IDE system 202 in various supported formats, including industry-specific control programming (e.g., control logic, structured text, sequential function charts, etc.) and HMI screen configuration input. Based on this design input 512 and information stored in an industry knowledgebase (predefined code modules 508 and visualizations 510, guardrail templates 506, physics-based rules 516, etc.), user interface component 204 renders design feedback 518 designed to assist the developer in connection with developing a system project 302 for configuration, control, and visualization of an industrial automation system.

In addition to control programming and visualization definitions, some embodiments of IDE system 202 can be configured to receive digital engineering drawings (e.g., computer-aided design (CAD) files) as design input 512. In such embodiments, project generation component 206 can generate portions of the system project 302—e.g., by automatically generating control and/or visualization code—based on analysis of existing design drawings. Drawings that can be submitted as design input 512 can include, but are not limited to, P&ID drawings, mechanical drawings, flow diagrams, or other such documents. For example, a P&ID drawing can be imported into the IDE system 202, and project generation component 206 can identify elements (e.g., tanks, pumps, etc.) and relationships therebetween conveyed by the drawings. Project generation component 206 can associate or map elements identified in the drawings with appropriate automation objects 222 corresponding to these elements (e.g., tanks, pumps, etc.) and add these automation objects 222 to the system project 302. The device-specific and asset-specific automation objects 222 include suitable code and visualizations to be associated with the elements identified in the drawings. In general, the IDE system 202 can examine one or more different types of drawings (mechanical, electrical, piping, etc.) to determine relationships between devices, machines, and/or assets (including identifying common elements across different drawings) and intelligently associate these elements with appropriate automation objects 222, code modules 508, and/or visualizations 510. The IDE system 202 can leverage physics-based rules 516 as well as pre-defined code modules 508 and visualizations 510 as necessary in connection with generating code or project data for system project 302.

The IDE system 202 can also determine whether pre-defined visualization content is available for any of the objects discovered in the drawings and generate appropriate HMI screens or AR/VR content for the discovered objects based on these pre-defined visualizations. To this end, the IDE system 202 can store industry-specific, asset-specific, and/or application-specific visualizations 510 that can be accessed by the project generation component 206 as needed. These visualizations 510 can be classified according to industry or industrial vertical (e.g., automotive, food and drug, oil and gas, pharmaceutical, etc.), type of industrial asset (e.g., a type of machine or industrial device), a type of industrial application (e.g., batch processing, flow control, web tension control, sheet metal stamping, water treatment, etc.), or other such categories. Predefined visualizations 510 can comprise visualizations in a variety of formats, including but not limited to HMI screens or windows, mashups that aggregate data from multiple pre-specified sources, AR overlays, VR objects representing 3D virtualizations of the associated industrial asset, or other such visualization formats. IDE system 202 can select a suitable visualization for a given object based on a predefined association between the object type and the visualization content.

In another example, markings applied to an engineering drawing by a user can be understood by some embodiments of the project generation component 206 to convey a specific design intention or parameter. For example, a marking in red pen can be understood to indicate a safety zone, two circles connected by a dashed line can be interpreted as a gearing relationship, and a bold line may indicate a camming relationship. In this way, a designer can sketch out design goals on an existing drawing in a manner that can be understood and leveraged by the IDE system 202 to generate code and visualizations. In another example, the project generation component 206 can learn permissives and interlocks (e.g., valves and their associated states) that serve as necessary preconditions for starting a machine based on analysis of the user's CAD drawings. Project generation component 206 can generate any suitable code (ladder logic, function blocks, etc.), device configurations, and visualizations based on analysis of these drawings and markings for incorporation into system project 302. In some embodiments, user interface component 204 can include design tools for developing engineering drawings within the IDE platform itself, and the project generation component 206 can generate this code as a background process as the user is creating the drawings for a new project. In some embodiments, project generation component 206 can also translate state machine drawings to a corresponding programming sequence, yielding at least skeletal code that can be enhanced by the developer with additional programming details as needed.

Also, or in addition, some embodiments of IDE system 202 can support goal-based automated programming. For example, the user interface component 204 can allow the user to specify production goals for an automation system being designed (e.g., specifying that a bottling plant being designed must be capable of producing at least 5000 bottles per second during normal operation) and any other relevant design constraints applied to the design project (e.g., budget limitations, available floor space, available control cabinet space, etc.). Based on this information, the project generation component 206 will generate portions of the system project 302 to satisfy the specified design goals and constraints. Portions of the system project 302 that can be generated in this manner can include, but are not limited to, device and equipment selections (e.g., definitions of how many pumps, controllers, stations, conveyors, drives, or other assets will be needed to satisfy the specified goal), associated device configurations (e.g., tuning parameters, network settings, drive parameters, etc.), control coding, or HMI screens suitable for visualizing the automation system being designed.

Some embodiments of the project generation component 206 can also generate at least some of the project code for system project 302 based on knowledge of parts that have been ordered for the project being developed. This can involve accessing the customer's account information maintained by an equipment vendor to identify devices that have been purchased for the project. Based on this information the project generation component 206 can add appropriate automation objects 222 and associated code modules 508 corresponding to the purchased assets, thereby providing a starting point for project development.

Some embodiments of project generation component 206 can also monitor customer-specific design approaches for commonly programmed functions (e.g., pumping applications, batch processes, palletizing operations, etc.) and generate recommendations for design modules (e.g., code modules 508, visualizations 510, etc.) that the user may wish to incorporate into a current design project based on an inference of the designer's goals and learned approaches to achieving the goal. To this end, some embodiments of project generation component 206 can be configured to monitor design input 512 over time and, based on this monitoring, learn correlations between certain design actions (e.g., addition of certain code modules or snippets to design projects, selection of certain visualizations, etc.) and types of industrial assets, industrial sequences, or industrial processes being designed. Project generation component 206 can record these learned correlations and generate recommendations during subsequent project development sessions based on these correlations. For example, if project generation component 206 determines, based on analysis of design input 512, that a designer is currently developing a control project involving a type of industrial equipment that has been programmed and/or visualized in the past in a repeated, predictable manner, the project generation component 206 can instruct user interface component 204 to render recommended development steps or code modules 508 the designer may wish to incorporate into the system project 302 based on how this equipment was configured and/or programmed in the past.

In some embodiments, IDE system 202 can also store and implement guardrail templates 506 that define design guardrails intended to ensure the project's compliance with internal or external design standards. Based on design parameters defined by one or more selected guardrail templates 506, user interface component 204 can provide, as a subset of design feedback 518, dynamic recommendations or other types of feedback designed to guide the developer in a manner that ensures compliance of the system project 302 with internal or external requirements or standards (e.g., certifications such as TUV certification, in-house design standards, industry-specific or vertical-specific design standards, etc.). This feedback 518 can take the form of text-based recommendations (e.g., recommendations to rewrite an indicated portion of control code to comply with a defined programming standard), syntax highlighting, error highlighting, auto-completion of code snippets, or other such formats. In this way, IDE system 202 can customize design feedback 518—including programming recommendations, recommendations of predefined code modules 508 or visualizations 510, error and syntax highlighting, etc.—in accordance with the type of industrial system being developed and any applicable in-house design standards.

Guardrail templates 506 can also be designed to maintain compliance with global best practices applicable to control programming or other aspects of project development. For example, user interface component 204 may generate and render an alert if a developer's control programing is deemed to be too complex as defined by criteria specified by one or more guardrail templates 506. Since different verticals (e.g., automotive, pharmaceutical, oil and gas, food and drug, marine, etc.) must adhere to different standards and certifications, the IDE system 202 can maintain a library of guardrail templates 506 for different internal and external standards and certifications, including customized user-specific guardrail templates 506. These guardrail templates 506 can be classified according to industrial vertical, type of industrial application, plant facility (in the case of custom in-house guardrail templates 506) or other such categories. During development, project generation component 206 can select and apply a subset of guardrail templates 506 determined to be relevant to the project currently being developed, based on a determination of such aspects as the industrial vertical to which the project relates, the type of industrial application being programmed (e.g., flow control, web tension control, a certain batch process, etc.), or other such aspects. Project generation component 206 can leverage guardrail templates 506 to implement rules-based programming, whereby programming feedback (a subset of design feedback 518) such as dynamic intelligent autocorrection, type-aheads, or coding suggestions are rendered based on encoded industry expertise and best practices (e.g., identifying inefficiencies in code being developed and recommending appropriate corrections).

Users can also run their own internal guardrail templates 506 against code provided by outside vendors (e.g., OEMs) to ensure that this code complies with in-house programming standards. In such scenarios, vendor-provided code can be submitted to the IDE system 202, and project generation component 206 can analyze this code in view of in-house coding standards specified by one or more custom guardrail templates 506. Based on results of this analysis, user interface component 204 can indicate portions of the vendor-provided code (e.g., using highlights, overlaid text, etc.) that do not conform to the programming standards set forth by the guardrail templates 506, and display suggestions for modifying the code in order to bring the code into compliance. As an alternative or in addition to recommending these modifications, some embodiments of project generation component 206 can be configured to automatically modify the code in accordance with the recommendations to bring the code into conformance.

In making coding suggestions as part of design feedback 518, project generation component 206 can invoke selected code modules 508 stored in a code module database (e.g., on memory 220). These code modules 508 comprise standardized coding segments for controlling common industrial tasks or applications (e.g., palletizing, flow control, web tension control, pick-and-place applications, conveyor control, etc.). In some embodiments, code modules 508 can be categorized according to one or more of an industrial vertical (e.g., automotive, food and drug, oil and gas, textiles, marine, pharmaceutical, etc.), an industrial application, or a type of machine or device to which the code module 508 is applicable. In some embodiments, project generation component 206 can infer a programmer's current programming task or design goal based on programmatic input being provided by the programmer (as a subset of design input 512), and determine, based on this task or goal, whether one of the pre-defined code modules 508 may be appropriately added to the control program being developed to achieve the inferred task or goal. For example, project generation component 206 may infer, based on analysis of design input 512, that the programmer is currently developing control code for transferring material from a first tank to another tank, and in response, recommend inclusion of a predefined code module 508 comprising standardized or frequently utilized code for controlling the valves, pumps, or other assets necessary to achieve the material transfer.

Customized guardrail templates 506 can also be defined to capture nuances of a customer site that should be taken into consideration in the project design. For example, a guardrail template 506 could record the fact that the automation system being designed will be installed in a region where power outages are common, and will factor this consideration when generating design feedback 518; e.g., by recommending implementation of backup uninterruptable power supplies and suggesting how these should be incorporated, as well as recommending associated programming or control strategies that take these outages into account.

IDE system 202 can also use guardrail templates 506 to guide user selection of equipment or devices for a given design goal; e.g., based on the industrial vertical, type of control application (e.g., sheet metal stamping, die casting, palletization, conveyor control, web tension control, batch processing, etc.), budgetary constraints for the project, physical constraints at the installation site (e.g., available floor, wall or cabinet space; dimensions of the installation space; etc.), equipment already existing at the site, etc. Some or all of these parameters and constraints can be provided as design input 512, and user interface component 204 can render the equipment recommendations as a subset of design feedback 518. In some embodiments, project generation component 206 can also determine whether some or all existing equipment can be repurposed for the new control system being designed. For example, if a new bottling line is to be added to a production area, there may be an opportunity to leverage existing equipment since some bottling lines already exist. The decision as to which devices and equipment can be reused will affect the design of the new control system. Accordingly, some of the design input 512 provided to the IDE system 202 can include specifics of the customer's existing systems within or near the installation site. In some embodiments, project generation component 206 can apply artificial intelligence (AI) or traditional analytic approaches to this information to determine whether existing equipment specified in design in put 512 can be repurposed or leveraged. Based on results of this analysis, project generation component 206 can generate, as design feedback 518, a list of any new equipment that may need to be purchased based on these decisions.

In some embodiments, IDE system 202 can offer design recommendations based on an understanding of the physical environment within which the automation system being designed will be installed. To this end, information regarding the physical environment can be submitted to the IDE system 202 (as part of design input 512) in the form of 2D or 3D images or video of the plant environment. This environmental information can also be obtained from an existing digital twin of the plant, or by analysis of scanned environmental data obtained by a wearable AR appliance in some embodiments. Project generation component 206 can analyze this image, video, or digital twin data to identify physical elements within the installation area (e.g., walls, girders, safety fences, existing machines and devices, etc.) and physical relationships between these elements. This can include ascertaining distances between machines, lengths of piping runs, locations and distances of wiring harnesses or cable trays, etc. Based on results of this analysis, project generation component 206 can add context to schematics generated as part of system project 302, generate recommendations regarding optimal locations for devices or machines (e.g., recommending a minimum separation between power and data cables), or make other refinements to the system project 302. At least some of this design data can be generated based on physics-based rules 516, which can be referenced by project generation component 206 to determine such physical design specifications as minimum safe distances from hazardous equipment (which may also factor into determining suitable locations for installation of safety devices relative to this equipment, given expected human or vehicle reaction times defined by the physics-based rules 516), material selections capable of withstanding expected loads, piping configurations and tuning for a specified flow control application, wiring gauges suitable for an expected electrical load, minimum distances between signal wiring and electromagnetic field (EMF) sources to ensure negligible electrical interference on data signals, or other such design features that are dependent on physical rules.

In an example use case, relative locations of machines and devices specified by physical environment information submitted to the IDE system 202 can be used by the project generation component 206 to generate design data for an industrial safety system. For example, project generation component 206 can analyze distance measurements between safety equipment and hazardous machines and, based on these measurements, determine suitable placements and configurations of safety devices and associated safety controllers that ensure the machine will shut down within a sufficient safety reaction time to prevent injury (e.g., in the event that a person runs through a light curtain).

In some embodiments, project generation component 206 can also analyze photographic or video data of an existing machine to determine inline mechanical properties such as gearing or camming and factor this information into one or more guardrail templates 506 or design recommendations.

Since several design features performed by project generation component 206 as described above may rely on inferences of the developer's design goals; discovery of common develop behaviors; learned associations between design goals and control code or visualizations, and other such intelligent decision-making, project generation component 206 can employ an associated trainable analytic module 520 in connection with performing its intelligent design functions. As will be described in more detail below, analytic module 520 can be trained by the IDE system's training component 210 based on analysis of system projects 302 generated and stored for multiple developers across different industrial enterprises.

Figure 6:
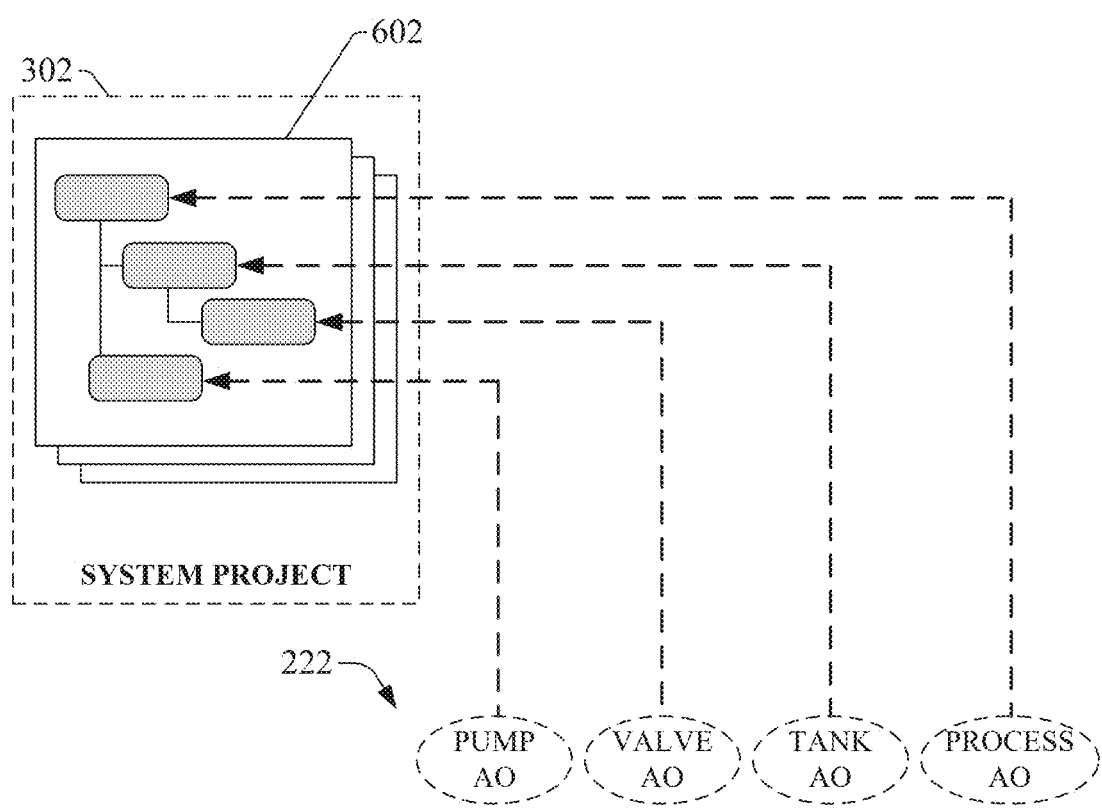
FIG. 6 is a diagram illustrating an example system project that incorporates automation objects into a project model.

As noted above, the system project 302 generated by IDE system 202 for a given automaton system being designed can be built upon an object-based architecture that uses automation objects 222 as building blocks. FIG. 6 is a diagram illustrating an example system project 302 that incorporates automation objects 222 into the project model. In this example, various automation objects 222 representing analogous industrial devices, systems, or assets of an automation system (e.g., a process, tanks, valves, pumps, etc.) have been incorporated into system project 302 as elements of a larger project data model 602. The project data model 602 also defines hierarchical relationships between these automation objects 222. According to an example relationship, a process automation object representing a batch process may be defined as a parent object to a number of child objects representing devices and equipment that carry out the process, such as tanks, pumps, and valves. Each automation object 222 has associated therewith object properties or attributes specific to its corresponding industrial asset (e.g., those discussed above in connection with FIG. 4), including executable control programming for controlling the asset (or for coordinating the actions of the asset with other industrial assets) and visualizations that can be used to render relevant information about the asset during runtime.

At least some of the attributes of each automation object 222 are default properties defined by the IDE system 202 based on encoded industry expertise pertaining to the asset represented by the objects. Other properties can be modified or added by the developer as needed (via design input 512) to customize the object 222 for the particular asset and/or industrial application for which the system projects 302 is being developed. This can include, for example, associating customized control code, HMI screens, AR presentations, or help files associated with selected automation objects 222. In this way, automation objects 222 can be created and augmented as needed during design for consumption or execution by target control devices during runtime.

Figure 7:
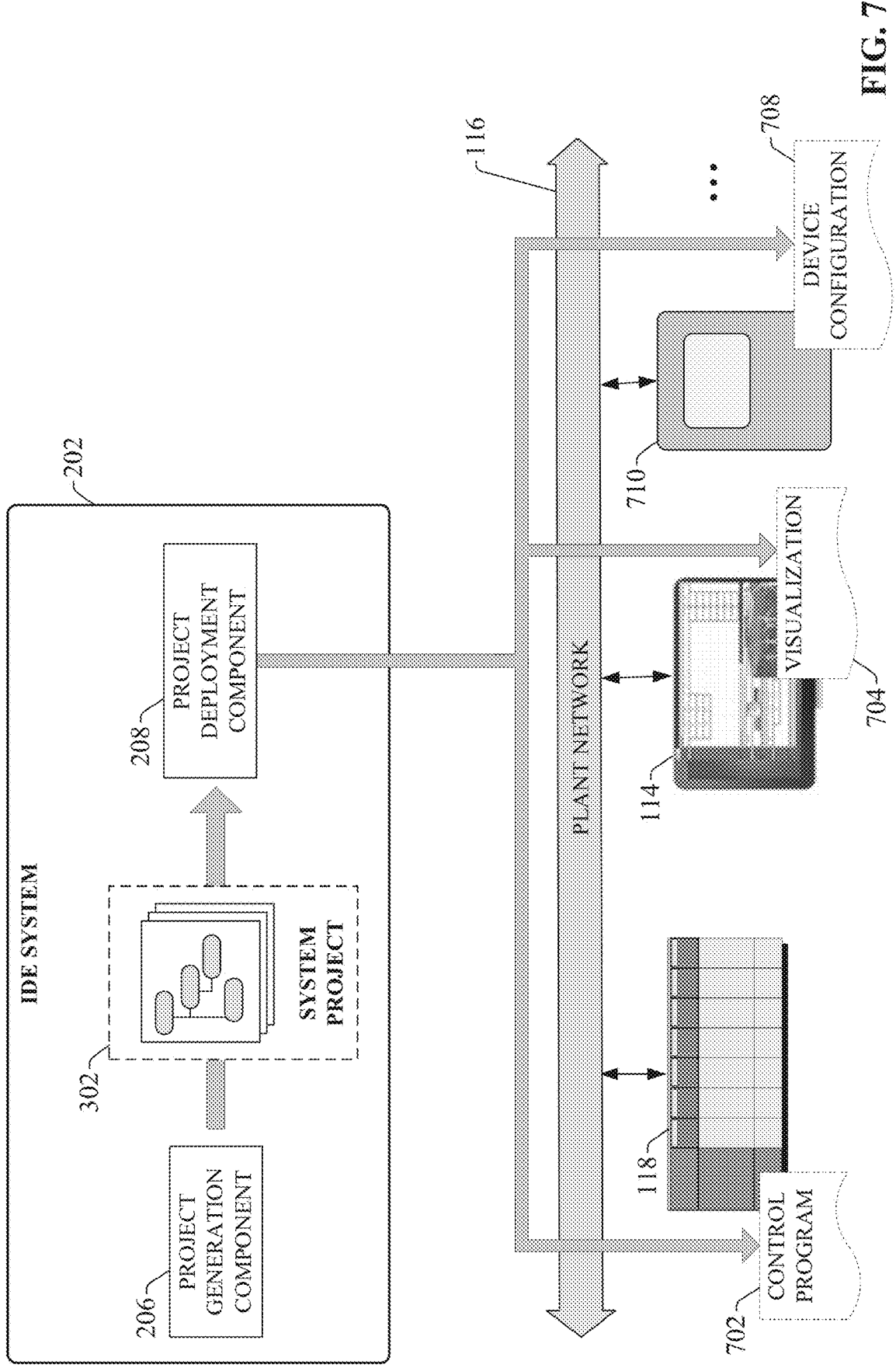
FIG. 7 is a diagram illustrating commissioning of a system project.

Once development on a system project 302 has been completed, commissioning tools supported by the IDE system 202 can simplify the process of commissioning the project in the field. When the system project 302 for a given automation system has been completed, the system project 302 can be deployed to one or more target control devices for execution. FIG. 7 is a diagram illustrating commissioning of a system project 302. Project deployment component 208 can compile or otherwise translate a completed system project 302 into one or more executable files or configuration files that can be stored and executed on respective target industrial devices of the automation system (e.g., industrial controllers 118, HMI terminals 114 or other types of visualization systems, motor drives 710, telemetry devices, vision systems, safety relays, etc.).

Conventional control program development platforms require the developer to specify the type of industrial controller (e.g., the controller's model number) on which the control program will run prior to development, thereby binding the control programming to a specified controller. Controller-specific guardrails are then enforced during program development which limit how the program is developed given the capabilities of the selected controller. By contrast, some embodiments of the IDE system 202 can abstract project development from the specific controller type, allowing the designer to develop the system project 302 as a logical representation of the automation system in a manner that is agnostic to where and how the various control aspects of system project 302 will run. Once project development is complete and system project 302 is ready for commissioning, the user can specify (via user interface component 204) target devices on which respective aspects of the system project 302 are to be executed. In response, an allocation engine of the project deployment component 208 will translate aspects of the system project 302 to respective executable files formatted for storage and execution on their respective target devices.

For example, system project 302 may include—among other project aspects—control code, visualization screen definitions, and motor drive parameter definitions. Upon completion of project development, a user can identify which target devices—including an industrial controller 118, an HMI terminal 114, and a motor drive 710—are to execute or receive these respective aspects of the system project 302. Project deployment component 208 can then translate the controller code defined by the system project 302 to a control program file 702 formatted for execution on the specified industrial controller 118 and send this control program file 702 to the controller 118 (e.g., via plant network 116). Similarly, project deployment component 208 can translate the visualization definitions and motor drive parameter definitions to a visualization application 704 and a device configuration file 708, respectively, and deploy these files to their respective target devices for execution and/or device configuration.

In general, project deployment component 208 performs any conversions necessary to allow aspects of system project 302 to execute on the specified devices. Any inherent relationships, handshakes, or data sharing defined in the system project 302 are maintained regardless of how the various elements of the system project 302 are distributed. In this way, embodiments of the IDE system 202 can decouple the project from how and where the project is to be run. This also allows the same system project 302 to be commissioned at different plant facilities having different sets of control equipment. That is, some embodiments of the IDE system 202 can allocate project code to different target devices as a function of the particular devices found on-site. IDE system 202 can also allow some portions of the project file to be commissioned as an emulator or on a cloud-based controller.

As an alternative to having the user specify the target control devices to which the system project 302 is to be deployed, some embodiments of IDE system 202 can actively connect to the plant network 116 and discover available devices, ascertain the control hardware architecture present on the plant floor, infer appropriate target devices for respective executable aspects of system project 302, and deploy the system project 302 to these selected target devices. As part of this commissioning process, IDE system 202 can also connect to remote knowledgebases (e.g., web-based or cloud-based knowledgebases) to determine which discovered devices are out of date or require firmware upgrade to properly execute the system project 302. In this way, the IDE system 202 can serve as a link between device vendors and a customer's plant ecosystem via a trusted connection in the cloud.

Copies of system project 302 can be propagated to multiple plant facilities having varying equipment configurations using smart propagation, whereby the project deployment component 208 intelligently associates project components with the correct industrial asset or control device even if the equipment on-site does not perfectly match the defined target (e.g., if different pump types are found at different sites). For target devices that do not perfectly match the expected asset, project deployment component 208 can calculate the estimated impact of running the system project 302 on non-optimal target equipment and generate warnings or recommendations for mitigating expected deviations from optimal project execution.

Figure 8:
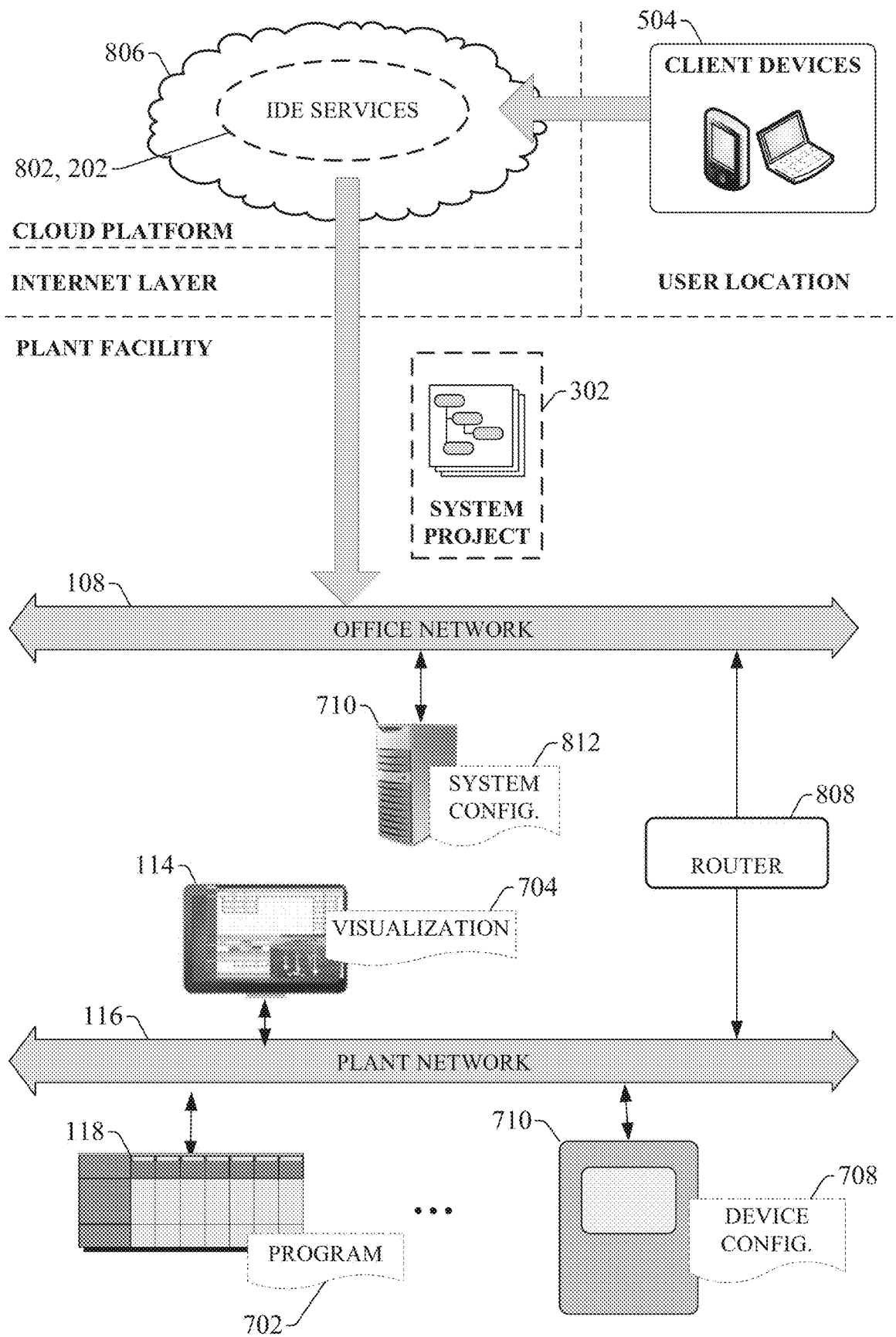
FIG. 8 is a diagram illustrating an example architecture in which cloud-based IDE services are used to develop and deploy industrial applications to a plant environment.

As noted above, some embodiments of IDE system 202 can be embodied on a cloud platform. FIG. 8 is a diagram illustrating an example architecture in which cloud-based IDE services 802 are used to develop and deploy industrial applications to a plant environment. In this example, the industrial environment includes one or more industrial controllers 118, HMI terminals 114, motor drives 710, servers 801 running higher level applications (e.g., ERP, MES, etc.), and other such industrial assets. These industrial assets are connected to a plant network 116 (e.g., a common industrial protocol network, an Ethernet/IP network, etc.) that facilitates data exchange between industrial devices on the plant floor. Plant network 116 may be a wired or a wireless network. In the illustrated example, the high-level servers 810 reside on a separate office network 108 that is connected to the plant network 116 (e.g., through a router 808 or other network infrastructure device).

In this example, IDE system 202 resides on a cloud platform 806 and executes as a set of cloud-based IDE service 802 that are accessible to authorized remote client devices 504. Cloud platform 806 can be any infrastructure that allows shared computing services (such as IDE services 802) to be accessed and utilized by cloud-capable devices. Cloud platform 806 can be a public cloud accessible via the Internet by devices 504 having Internet connectivity and appropriate authorizations to utilize the IDE services 802. In some scenarios, cloud platform 806 can be provided by a cloud provider as a platform-as-a-service (PaaS), and the IDE services 802 can reside and execute on the cloud platform 806 as a cloud-based service. In some such configurations, access to the cloud platform 806 and associated IDE services 802 can be provided to customers as a subscription service by an owner of the IDE services 802. Alternatively, cloud platform 806 can be a private cloud operated internally by the industrial enterprise (the owner of the plant facility). An example private cloud platform can comprise a set of servers hosting the IDE services 802 and residing on a corporate network protected by a firewall.

Cloud-based implementations of IDE system 202 can facilitate collaborative development by multiple remote developers who are authorized to access the IDE services 802. When a system project 302 is ready for deployment, the project 302 can be commissioned to the plant facility via a secure connection between the office network 108 or the plant network 116 and the cloud platform 806. As discussed above, the industrial IDE services 802 can translate system project 302 to one or more appropriate executable files—control program files 702, visualization applications 704, device configuration files 708, system configuration files 812—and deploy these files to the appropriate devices in the plant facility to facilitate implementation of the automation project.

Several of the automation system development services provided by the IDE system 202—including, for example, identification and integration of reusable code or visualizations for common control functions and equipment, inference of a developer's design intentions for the purpose of generating design recommendations or automatically generating elements of the system project, simulations for dynamic design feedback and recommendations, conversion of legacy control projects to IDE projects supported by the IDE system 202, optimization of control code, supervisory monitoring using a digital twin, and other such features—can be continually improved via ongoing training of the IDE system 202. This training can be based on one or both of development information extracted from multiple control system projects processed by the IDE system 202 over time or real-world data received from physical plant floor systems. For embodiments of the IDE system 202 implemented on a cloud platform 806 and made available to multiple users, the IDE system's training component 210 can apply analytics (e.g., AI analytics, machine learning, or other types of analytics) to large amounts of system project data received from multiple users of the IDE services and use results of these analytics for training or learning purposes. In this way, the automated development features offered by the IDE system 202 can be automatically improved over time as new project data is collected and analyzed. Data that can be analyzed for training or learning purposes can include both design data (e.g., system project data) from which common design approaches and relationships between project components can be learned, as well runtime production data collected after these system projects have been commissioned for operation.

Figure 9:
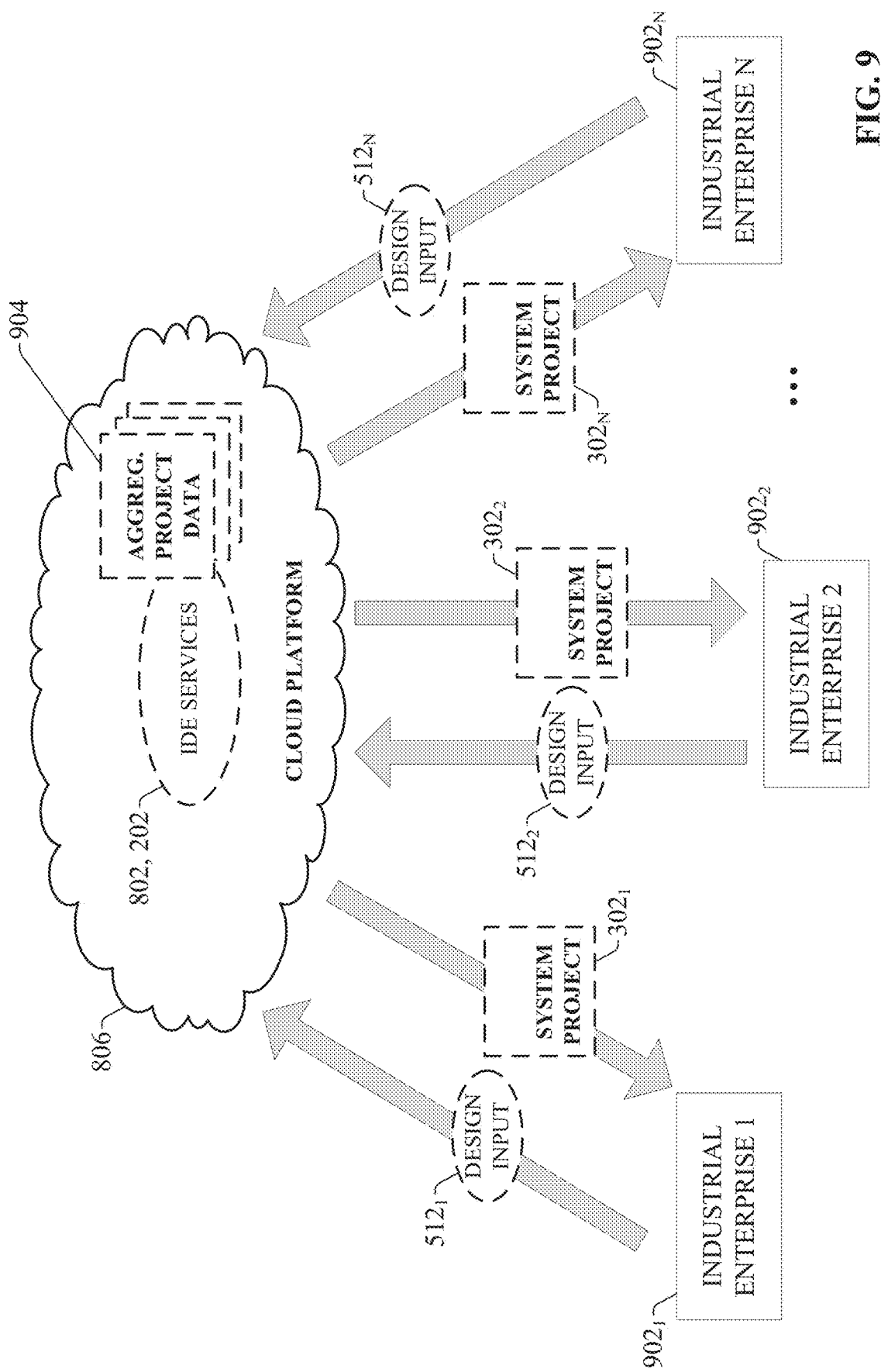
FIG. 9 is a diagram illustrating an example architecture in which cloud-based IDE services are accessed by multiple users across different industrial enterprises to develop and deploy industrial applications for their respective plant environments.

FIG. 9 is a diagram illustrating an example architecture in which cloud-based IDE services 802 are accessed by multiple users across different industrial enterprises 902 to develop and deploy industrial applications for their respective plant environments. As described in previous examples, developers at the respective industrial enterprises 902 can submit design input 512 to the IDE system 202 (implemented as cloud-based IDE services 802 in this example) to facilitate creation of system projects 302 which can then be deployed at the respective industrial enterprises 902. Using this architecture, client devices at the respective industrial enterprises 902 can leverage the centralized industrial IDE services 802 to develop their own industrial system projects 302. System projects 302 for each industrial enterprise 902 are securely stored on the cloud platform 806 during development, and can be deployed to automation system devices at the respective industrial enterprises 902 from the cloud platform 806 (as depicted in FIG. 8) or can be downloaded to the respective client devices at the industrial enterprises 902 for localized deployment from the client devices to one or more industrial devices. Since IDE services 802 reside on a cloud-platform 806 with access to internet-based resources, some embodiments of the IDE services 802 can also allow users to access remote web-based knowledgebases, vendor equipment catalogs, or other sources of information that may assist in developing their industrial control projects.

Cloud-based IDE services 802 can support true multi-tenancy across the layers of authentication authorization, data segregation at the logical level, and network segregation at the logical level. End users can access the industrial IDE services 802 on the cloud platform 806, and each end user's development data—including design input 512, design feedback 518, and system projects 302—is encrypted (e.g., by encryption component 214) such that each end user can only view their own data. In an example implementation, an administrator of the cloud-based industrial IDE services 802 may maintain a master virtual private cloud (VPC) with appropriate security features, and each industrial enterprise 902 can be allocated a portion of this VPC for their own access to the IDE services 802. In an example embodiment, an encrypted multi-protocol label switching (MPLS) channel can protect the entire corpus of an end user's data such that the data can only be viewed by specific computers or domains that have an appropriate certificate.

In order to improve the design and runtime services offered by the cloud-based implementation of IDE system 202, end users can be encouraged to allow portions of their system project data to be stored on the cloud platform anonymously as aggregated project data 904. The IDE system's training component 210 can use this aggregated project data 904 as training data to improve the ability of the project generation component 206 to perform such functions as generating and recommending suitable control code modules or visualizations for a given design goal, inferring design goals based on a developer's design input 512, generating equipment recommendations, rendering appropriate design feedback 518 in response to design input 512, or other such functions. Results of this training can be encoded in an analytic module 520 used by the project generation component 206 to analyze design input 512 and generate suitable design feedback 518, as well as to auto-generate portions of system projects 302 based on design input 512 in view of design patterns learned by the training component 210.

Figure 10:
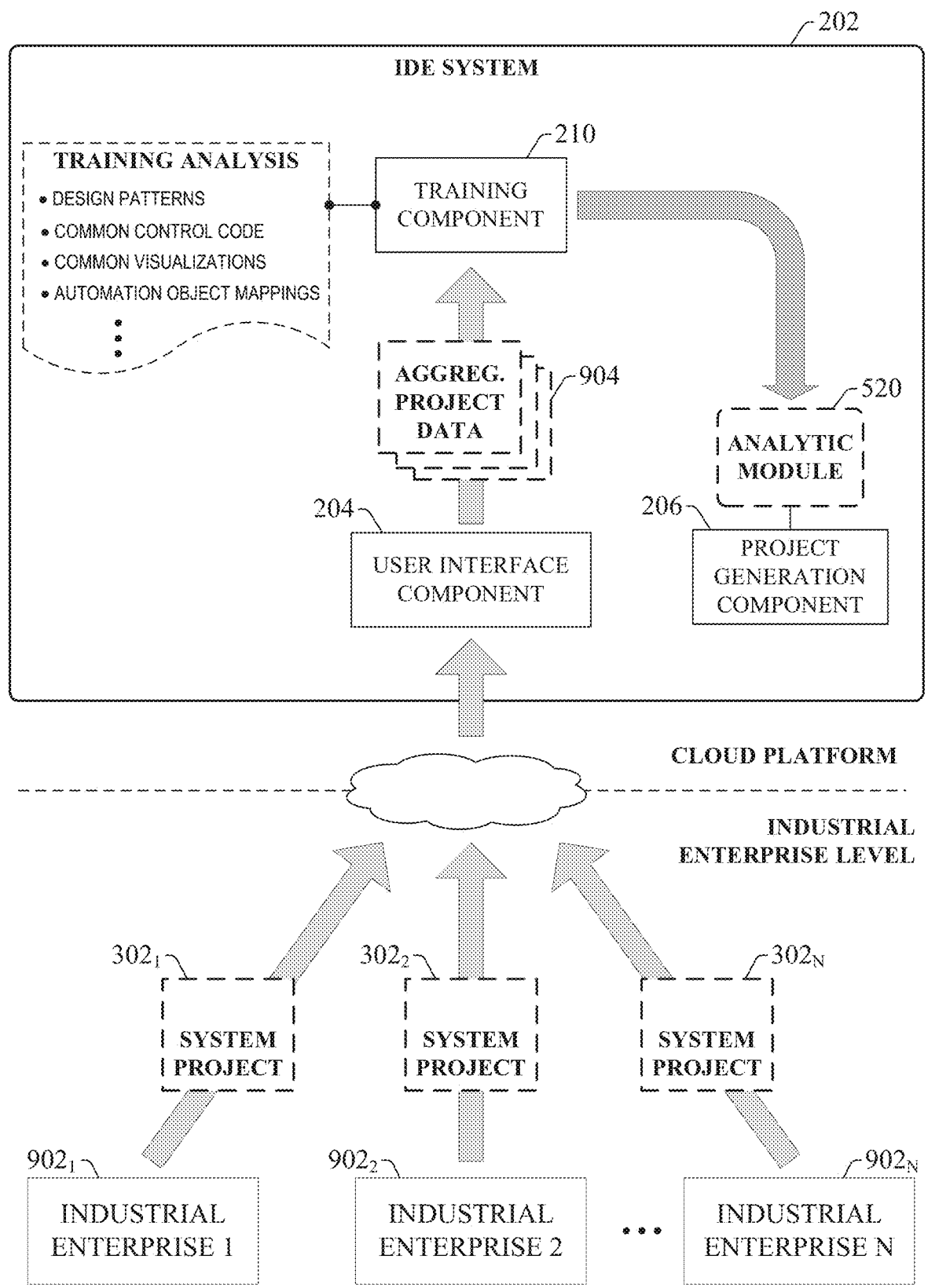
FIG. 10 is a diagram illustrating training of an analytic module over time by an IDE system's training component.

FIG. 10 is a diagram illustrating training of the analytic module 520 over time by the IDE system's training component 210. As developers across multiple industrial enterprises 902 access cloud-based industrial IDE system 202 to develop system projects 302, selected portions of these diverse system projects 302 can be aggregated as aggregated project data 904 and fed to the IDE system's training component 210 as training data. Aggregated project data 904 can be collected in a manner that protects the industrial enterprises' proprietary project information. In some embodiments, IDE system 202 may only feed a user's project data to the training module 210 if the user expressly volunteers to allow their project information to be used to train the IDE system 202. In some embodiments, data volume thresholds can be defined such that, when the amount of collected project data reaches a defined threshold, anonymization and aggregation of the collected is triggered and the aggregated data is fed to the training component 210. This can reassure owners of the industrial assets and associated system projects 302 that their proprietary raw data is not being viewed by outside parties. An obfuscation routine can also be applied to the data sets to remove locations, names, or other potentially identifying information from the aggregated project data 904.

Based on training analysis performed on the aggregated project data 904, training component 210 can learn design patterns and associations from the collected project data to facilitate faster training of the analytic module 520 used by the project generation component 206. Training component 210 can apply any suitable type of analytics to the aggregated project data 904, including but not limited to artificial intelligence analysis, machine learning, heuristics, statistical deep learning models, etc.

The training analysis performed by the training component 210 can include, for example, analyzing the aggregated project data 904 to identify design patterns, or frequently used approaches to designing certain types of industrial applications or automation functions. For example, training component 210 can identify, based on analysis of the aggregated project data 904, that certain types of control functions—e.g., palletizing, flow control, web tension control, conveyor control, pick-and-place functions, etc.—are frequently programmed using control code that is generally similar in form across different system projects 302. Based on this observation, training component 210 can train analytic module 520 to recognize when a designer is developing a system project 302 that includes one of the identified control functions (based on analysis of design input 512) and either recommend or insert a code module 508 corresponding to the matching control code. In some embodiments, training component 210 may also generate a new code module 508 that contains the learned control code and store the new code module 508 in the IDE system's industry knowledgebase for subsequent retrieval by the project generation component 206. Training module 210 can classify this generated code module 508 in the industry knowledgebase according to one or more of an appropriate industrial vertical (e.g., automotive, food and drug, oil and gas, textiles, marine, pharmaceutical, etc.), industrial application, or type of machine to which the code module 508 relates, per the training analysis results.

Training component 210 can apply similar training analysis to identify common ways in which developers create visualizations (e.g., HMI screens or animation objects, dashboards, mashups, AR/VR visualization objects, etc.) for various types of machines, processes, or automation applications. Based on results of such analysis, training component 210 can train analytic module 520 to recognize these design scenarios (e.g., to identify when a developer's system project 302 includes a machine, process, or automation function for which a common visualization 510 has been identified) and either recommend or automatically add the appropriate visualization 510 to the system project 302.

In some embodiments, training module 210 can also analyze subsets of aggregated project data 904 that include engineering drawings to learn user-defined associations between drawing elements and automation objects 222, code modules 508, or visualizations 510. For example, some system projects 302 may include engineering drawings (e.g., P&ID drawings, mechanical drawings, flow diagrams, etc.) that include drawing elements representing such industrial assets as tanks, pumps, safety devices, motor drives, power supplies, piping, etc. The system projects 302 may also include user-defined control code modules 508, visualizations 510 (e.g., HMI objects or screens, dashboards, AR/VR objects, etc.), and/or automation objects 222 having defined associations with elements represented by the drawings. Training module 210 can be configured to recognize, based on training analysis performed on the aggregated project data 904, that designers frequently associate particular code modules 508, visualizations 510, or automation objects 222 with respective drawing elements. Based on these learned associations, training module 210 can train the analytic module 520 to automatically create these associations in new system projects 302 when these drawing elements are discovered in engineering drawings submitted to the IDE system 202 (as described above in connection with FIG. 5). For example, if a developer creates or submits a P&ID drawing comprising drawing elements for which commonly associated code modules 508, visualizations 510, or automation objects 222 have been discovered by the training component 210, project generation component 206 can map the drawing elements with the appropriate project elements in accordance with the trained analytic module 520.

In some embodiments, training component 210 can also analyze aggregated project data 904 to learn correlations between design goals specified by the design input 512 (e.g., a goal that a bottling line must be capable of producing a specified minimum number of bottles per second during normal operation, a material transfer operation, a web tension control requirement, waste water treatment requirements, etc.) and code, visualizations, automation objects, device configurations or parameter settings, drawings, or other project elements that are frequently generated by developers to satisfy these design goals. Based on these learned associations, training component 210 can train the analytic module 520 to recommend or implement these frequently used project elements when subsequent design input 512 specifying the design goal is received.

Figure 11:
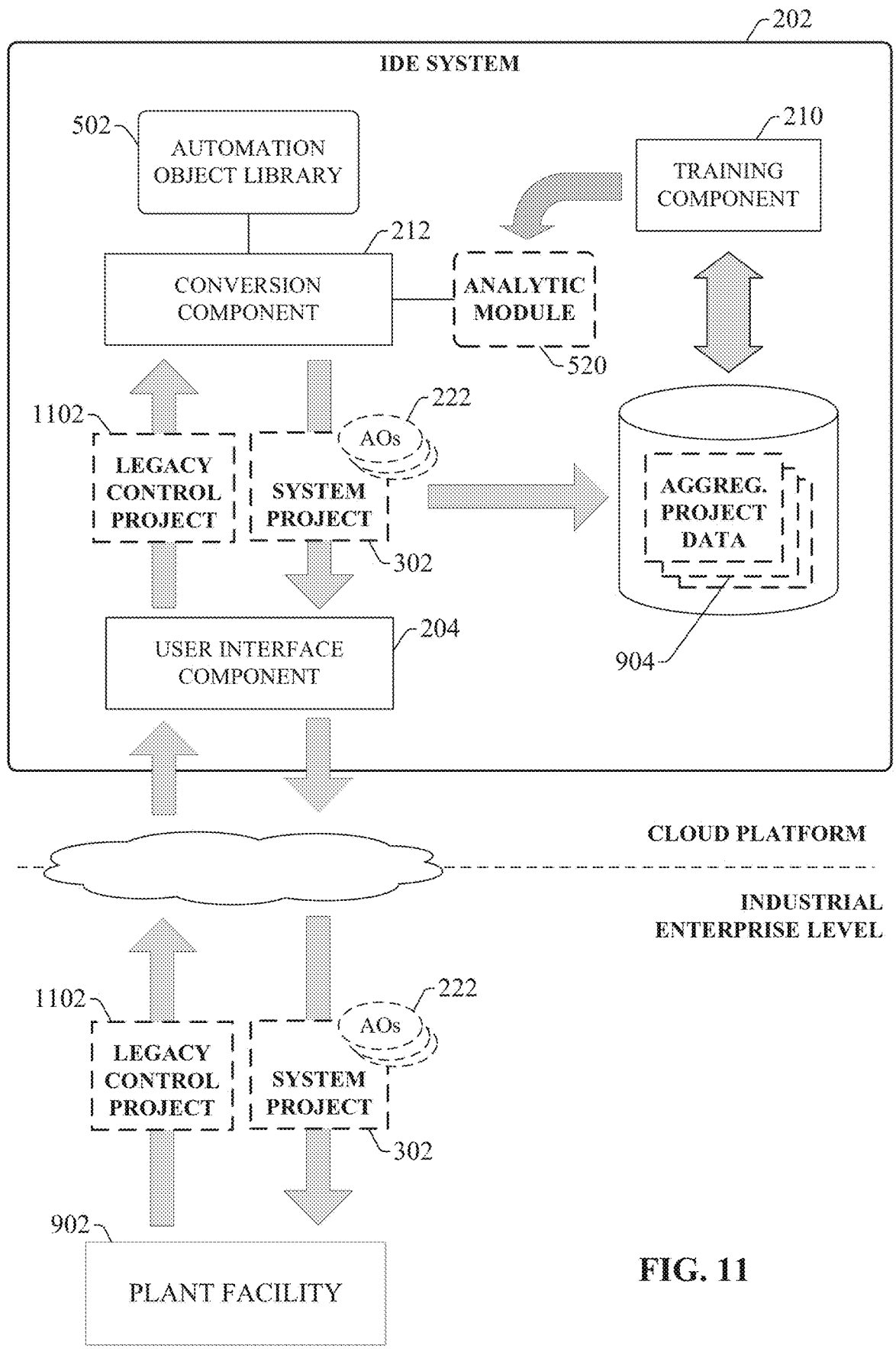
FIG. 11 is a diagram illustrating submission of a legacy control project to an IDE system for conversion into an object-based system project.

In addition to using the trained analytic module 520 in connection with developing new system projects 302, some embodiments of IDE system 202 can also use the analytic module 520 to convert legacy control projects that were developed using other development platforms to system projects 302 that accord with the object-based system project format supported by IDE system 202. FIG. 11 is a diagram illustrating submission of a legacy control project 1102 to the IDE system 202 for conversion into an object-based system project 302. In this embodiment, IDE system 202 includes a conversion component 212 configured to receive legacy control project data 1102 submitted by a developer (e.g., a ladder logic program file, a structured text program file, a function block diagram program file, a sequential function chart file, etc.) and convert the legacy control project data 1102 to a system project 302 having one or more of the project features described above. This allows existing control projects to be migrated to the platform supported by IDE system 202.

For example, in response to receipt of legacy control project data 1102, conversion component 212 can intelligently map existing code routines or other project elements discovered in the legacy control project data 1102 to respective automation objects 222 or code modules 508. When mapping legacy project elements to automation objects 222, conversion component 212 may either map an existing automation object 222 from the automation object library 502 to appropriate elements discovered in the legacy project, or may generate a new automation object 222 for inclusion in the new system project 302. In the former case, conversion component 212 can be configured to recognize segments of control code within the legacy control project data 1102 that correspond to an equivalent automation object 222 available in the automation object library 502. For example, conversion component 212 may recognize that a code segment within the legacy project is intended to control a certain industrial asset (e.g., a pump, a valve, a stamping press, etc.) for which an automation object 222 is available in the automation object library 502. Accordingly, conversion component 212 can replace or supplement this code segment in the new system project 302 with the appropriate automation object 222 corresponding to this industrial asset. If the automation object 222 for the asset has an associated recommended visualization for rendering a graphical representation of the asset (e.g., on an HMI or AR/VR application), this visualization will also be included in the new system project 302.

In another example, the conversion component 212 may recognize that a certain segment of control code is used multiple times within the imported legacy control project data 1102. Based on this recognition, conversion component 212 can create a new automation object 222 representing this code segment and use this new automation object 222 within the new system project 302 in place of the original code segment.

Conversion component 212 can leverage analytic module 520 in connection with recognizing code segments having associated automation objects 222. In this regard, training component 210 can learn to recognize such code segments based on the training analysis performed on aggregated project data 904, and train the analytic module 520 to recognize these code segments in subsequent legacy projects. The new automation object 222 can include logic corresponding to the code segments, alarm definitions for the code segment, the ability to record historical data for the code segment, or any other automation object properties discussed above in connection with FIG. 4.

Conversion component 212 can also optimize or standardize segments of control code discovered in the legacy project. For example, conversion component 212 can be configured to infer control functionality of a control code segment discovered within the legacy control project data 1102, and to determine whether a predefined code module 508 for performing this inferred functionality is available in the IDE system's industry knowledgebase. If such a code module 508 is available, the conversion component 212 will replace the original control code segment with the appropriate code module 508 in the new system project 302. This can effectively convert previously written control code to a preferred, standardized format represented by the pre-defined code modules 508. To assist with mapping of legacy code segments to code modules 508, training component 210 can train the analytic module 520 to recognize legacy code segments that correspond to certain types of automation functions having corresponding predefined code modules 508. Conversion component 212 can then leverage analytic module 520 during conversion in connection with performing these mappings.

In some embodiments, conversion component 212 can also perform transformations on control code found in the legacy control project data 1102 to optimize the control programming; e.g., by discovering and removing dead code, rewriting code portions to remove complexity, etc.

In some embodiments, conversion component 212 can also discern inherent hierarchies within imported legacy code based on recognition of which segments of code pass data to each other, and re-organize the control code in the new system project 302 based on these discovered hierarchies. The discovered hierarchies can also be used to define hierarchical relationships between any automation objects 222 added to the new system project 302, or can be incorporated into the IDE system's model of the plant. As in previous examples, analytic module 520 can be trained by the training component 210 to assist the conversion component 212 to recognize these hierarchies.

Also, in some embodiments, conversion component 212 can be configured to generate engineering documents from imported legacy code by reverse engineering algorithmic flowcharts or state machines that were used as the basis for writing the original code. These engineering documents can include, but are not limited to, state machine diagrams representing the control algorithm implemented by the control program, I/O drawings generated based on discovery of inputs and outputs defined in the control program, bills of material, or other such documentation.

When legacy control project data 1102 is converted to a new system project 302 as described above, at least a portion of the resulting system project 320 can be added to the aggregated project data 904 to enhance the set of training data used by the training component 210 to train the analytic module 520. In some embodiments, portions of the legacy control project data 1102 can also be stored in association with the system project 302 as part of the aggregated project data 904 to assist the training component 210 in learning to recognize legacy code segments that correspond to automation objects 222, code modules 508, visualizations 510, engineering documents, or other system project elements. Thus, as more legacy control projects 1102 are converted, the base of aggregated project data 904 is increased, and the accuracy of the analytic module 520 is improved.

In some embodiments, in addition to maintaining a global analytic module 520 for generating and converting system projects, IDE system 202 can also allow third parties (e.g., OEMs, system integrators, etc.) to create their own analytic module 520 and perform conversions of their customers' projects. For example, a secure portion of the cloud platform 806 can be allotted to the third party and instances of the IDE system's services can be instantiated on the third party's secure portion of the cloud. Using these segregated services, third parties can allow their customers to provide their legacy project data to the OEM's platform, which converts the project data and provides a new version based on a customized analytic module 520 provided by the third party.

In some embodiments, IDE system 202 can provide further training to the analytic module 520 based on runtime data collected from automation systems at the industrial enterprises 902 after system projects 302 have been deployed. In some implementations, analysis of runtime or performance data for the purposes of training an analytic module 520 can be performed separately for different third-party users of the IDE system 202. This can allow a third party with a large customer base to anonymously collect project data from their customers for the purpose of improving their services. For example, an OEM that manufactures turbines may wish to collect performance metrics on all their installed turbines across their customer base to learn performance patterns. In this scenario, IDE system 202 can serve as a trusted proxy that collects this information anonymously (agnostic to turbine owner) and provide this information to the OEM. The data provided to the OEM will be aggregated and abstracted from the asset owners. In such embodiments, the OEMs can provide an application programming interface (API) to the data exchange layer that ensures data from their customers will be output in a format readable by the OEM.

In some embodiments, automation objects 222 that make up a system project 302 can also be configured with runtime analytic capabilities that allow the automation objects to learn the runtime behavior of their corresponding industrial assets based on analysis of real-time performance data collected from the automation systems represented by system project 302. The automation objects 222 can store this learned runtime behavior as part of their identity. This information can be used for a variety of purposes, including but not limited to predictive analysis, further training of the analytic module 520, automatic reconfiguration of system project elements (e.g., control code, visualizations, etc.) based on learned runtime behaviors of the industrial assets, or other such uses.

FIGS. 12-14*b* illustrate various methodologies in accordance with one or more embodiments of the subject application. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

Figure 12:
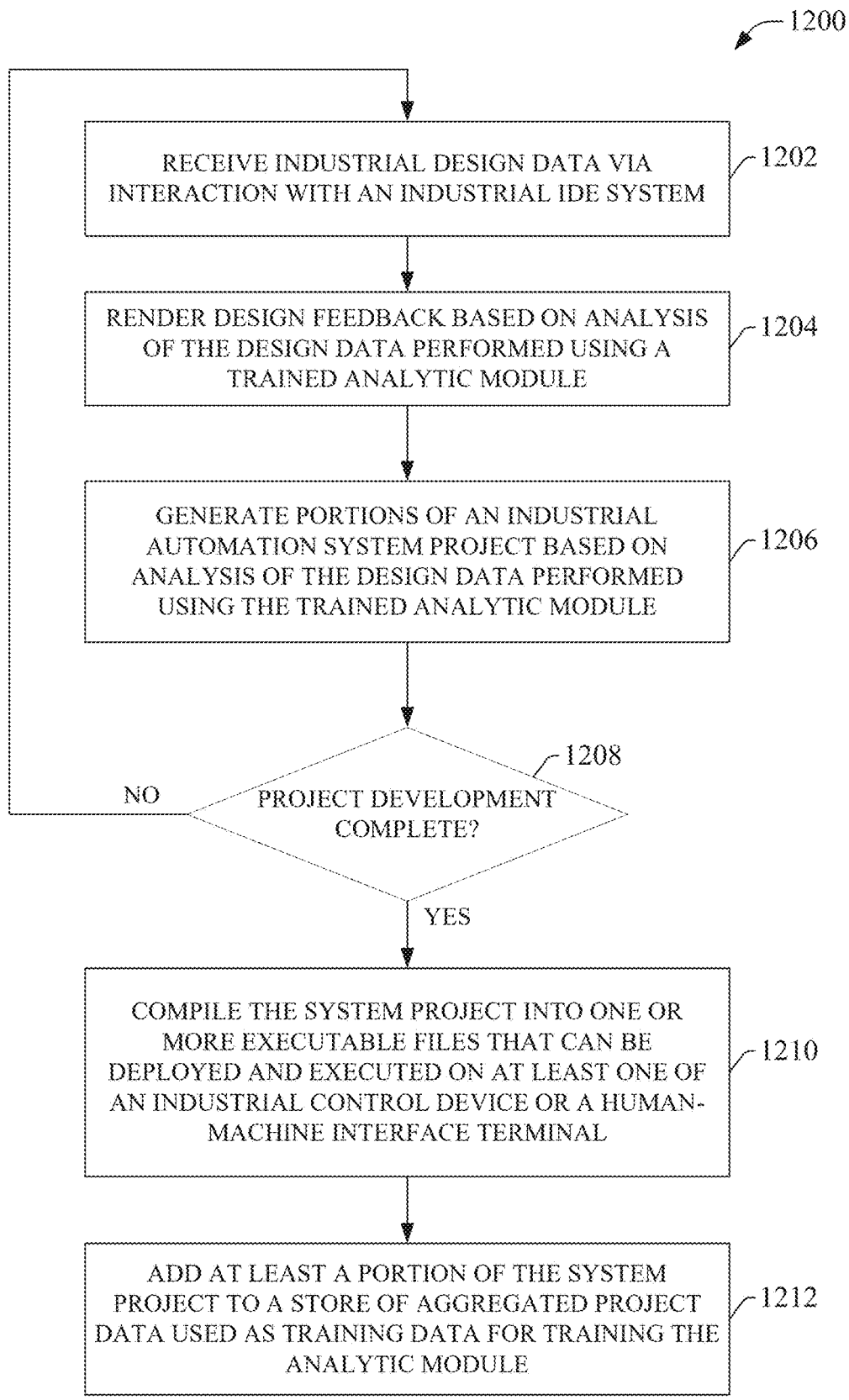
FIG. 12 is a flowchart of an example methodology for developing an industrial automation system project using an industrial IDE system with the aid of a trained analytic model.

FIG. 12 illustrates an example methodology 1200 for developing an industrial automation system project using an industrial IDE system with the aid of a trained analytic module. Initially at 1202, industrial design data for an automation system being developed is received via interaction with an industrial IDE system. The industrial design data can comprise, for example, control programming, visualization development input, specified design goals or specifications for the automation system, or other such design input. At 1204, design feedback is rendered by the IDE system based on analysis of the design data performed using a trained analytic module. Example design feedback can include, for example, control code syntax highlighting or error highlighting designed to enforce in-house or industry-standard coding practices, suggestions for rewriting or reorganizing control code to conform to defined programming standards, suggested automation objects to be added to the design project based on an inference of the programmer's intentions, or other such feedback.

At 1206, portions of an industrial automation system project are generated based on analysis of the design data performed using the trained analytic module. This can include, for example, automatically adding selected predefined code modules for performing automation functions inferred from the design input, automatically adding automation objects corresponding to industrial assets represented by the design input, or other such development functions.

At 1208, a determination is made as to whether project development is complete. This determination may be made, for example, in response to an indication from the developer that the automation system project is ready to be parsed and compiled. If development is not complete (NO at step 1208) the methodology returns to step 1202 and development continues. Steps 1202-1206 are repeated until development is complete (YES at step 1208), at which time the methodology proceeds to step 1210.

At 1210, the industrial automation system project is compiled into one or more executable files that can be deployed and executed on at least one of an industrial control device (e.g., a PLC or another type of industrial control device), a human-machine interface terminal, or another type of industrial device. At 1212, at least a portion of the system project is added to a store of aggregated project data to be used as training data for training the analytic module.

Figure 13:
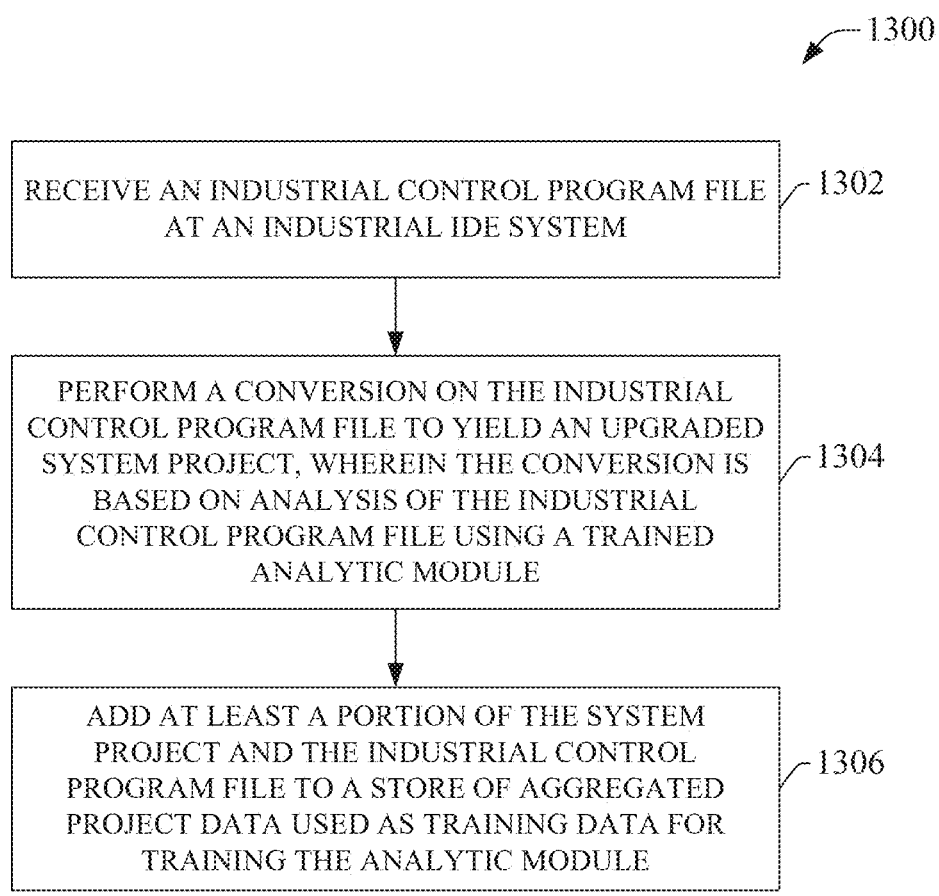
FIG. 13 is a flowchart of an example methodology for converting a legacy industrial control program to an upgraded format by an industrial IDE system using a trained analytic module.

FIG. 13, illustrates an example methodology 1300 for converting a legacy industrial control program to an upgraded format by an industrial IDE system using a trained analytic module. Initially, at 1302, an industrial control program file is received at the industrial IDE system. The program file may be, for example, a ladder logic program file, a sequential function chart program file, a function block diagram program file, a structured text program file, or a control program file of another format. At 1304, a conversion is performed on the industrial control program file received at step 1302 to yield an upgraded system project, wherein the conversion is performed based on an analysis of the industrial control program file using a trained analytic module. The conversion can involve, for example, replacing code segments in the legacy program file with predefined code segments that perform similar or equivalent functionality, replacing code segments with automation objects having corresponding functionality, removing unused code, reorganizing the program code based on discovered relationships or hierarchies within the program, or other such conversion functions.

At 1306, at least a portion of the system project and the original program file are added to a store of aggregated project data to be used as training data for training the analytic model used to perform the conversion.

Figure 14A:
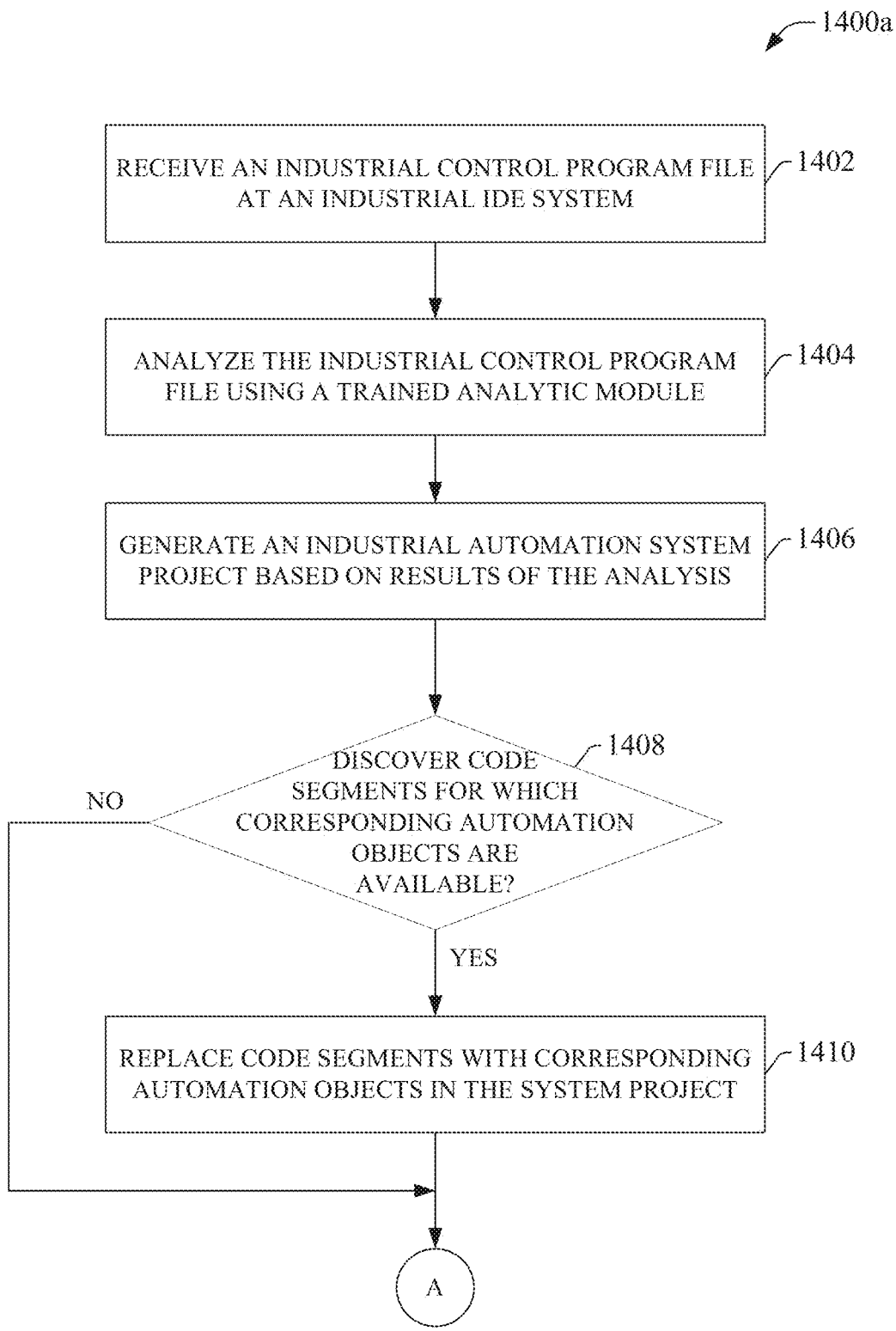
FIG. 14a is a flowchart of a first part of an example methodology for converting a legacy industrial control program to an upgraded format by an industrial IDE system using a trained analytic module.

FIG. 14*a* illustrates a first part of an example methodology 1400*a* for converting a legacy industrial control program to an upgraded format by an industrial IDE system using a trained analytic module. Initially, at 1402, an industrial control programming file (e.g., a ladder logic file, a structured text file, a function block diagram file, etc.) is received at an industrial IDE system. At 1404, the industrial control program file is analyzed using a trained analytic module. At 1406, an industrial automation system project is generated based on results of the analysis performed at step 1404.

At 1408, a determination is made as to whether code segments are discovered in the control program file for which corresponding automation objects supported by the IDE system are available. This determination can be made based on an inference of the functionality of the code segments, as determined based in part on the trained analytic module. If such code segments are discovered (YES at step 1408), the methodology proceeds to step 1410, where the discovered code segments are replaced with the corresponding automation objects in the system project generated at step 1406. If no such code segments are discovered (NO at step 1408), the methodology proceeds without performing step 1410.

Figure 14B:
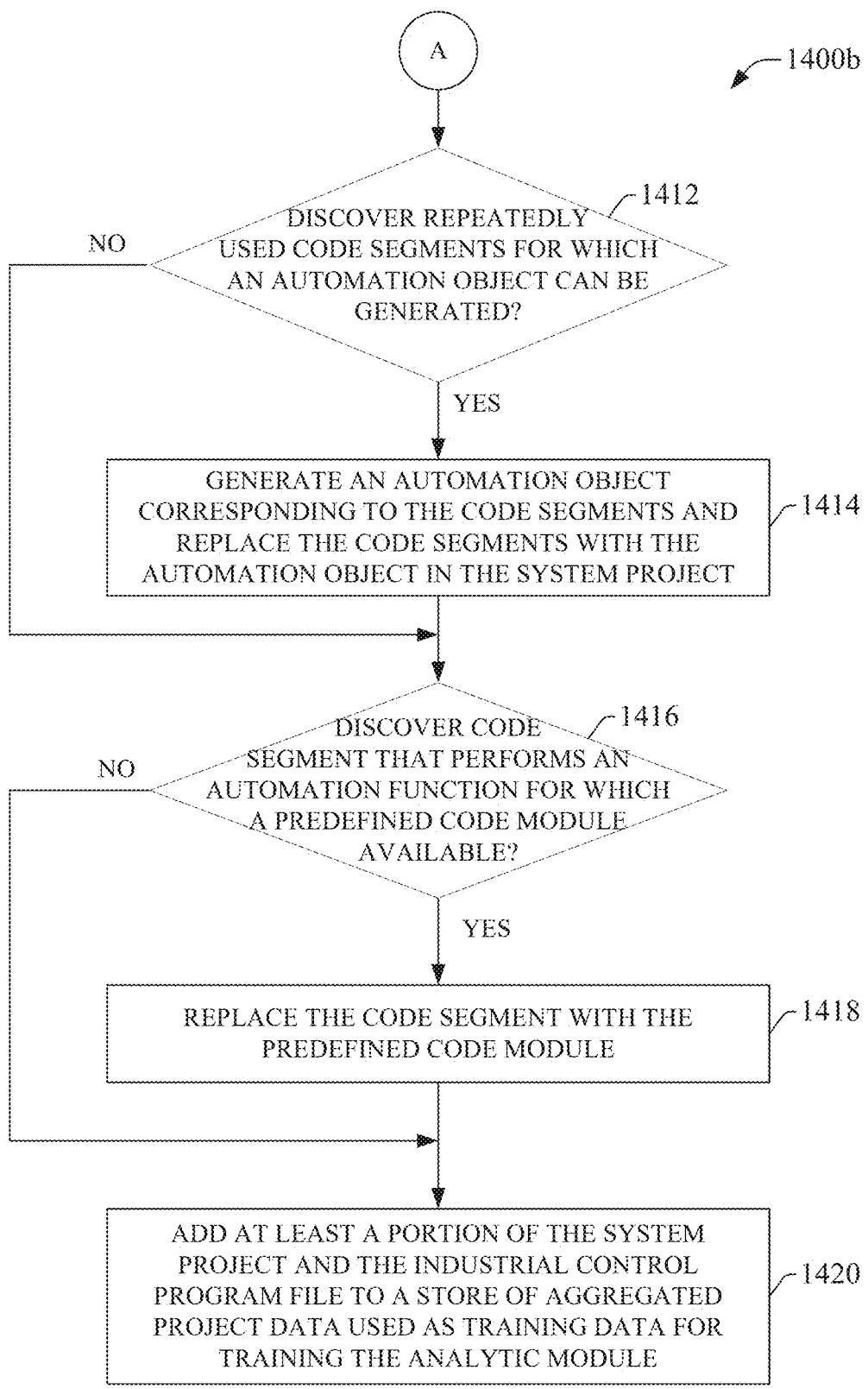
FIG. 14b is a flowchart of a second part of the example methodology for converting a legacy industrial control program to an upgraded format by an industrial IDE system using a trained analytic module.

The methodology continues with the second part 1400*b* illustrated in FIG. 14*b*. At 1412, a determination is made as to whether repeatedly used code segments are present within the program file for which an automation object can be generated. This determination can be made based on an inference of the functionality of the repeated code segments, as inferred based in part on the trained analytic module. If such code segments are discovered (YES at step 1412), the methodology proceeds to step 1414, where an automation object corresponding to the code segments discovered at step 1412 is generated, and the code segments are replaced in the system project with the generated automation object.

If no repeatedly used code segments for which an automation object can be generated are discovered at step 1412 (NO at step 1412), the methodology proceeds to step 1416 without performing step 1414. At 1416, a determination is made as to whether a code segment is discovered in the program file that performs an automation function for which a predefined code module is available. This determination can be made based on an inference of the functionality of the code segment, as inferred based in part on the trained analytic module. If such a code segment is discovered (YES at step 1416), the methodology proceeds to step 1418, where the code segment is replaced in the system project with the predefined code module.

If no such code segment is discovered (NO at step 1416), the methodology proceeds to step 1420 without performing step 1418. At 1420, at least a portion of the system project generated as a result of steps 1406-1418 and the industrial control program file received at step 1402 are added to a store of aggregated project data to be used as training data for training the analytic module.

Embodiments, systems, and components described herein, as well as control systems and automation environments in which various aspects set forth in the subject specification can be carried out, can include computer or network components such as servers, clients, programmable logic controllers (PLCs), automation controllers, communications modules, mobile computers, on-board computers for mobile vehicles, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including Device-Net, ControlNet, safety networks, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 15:
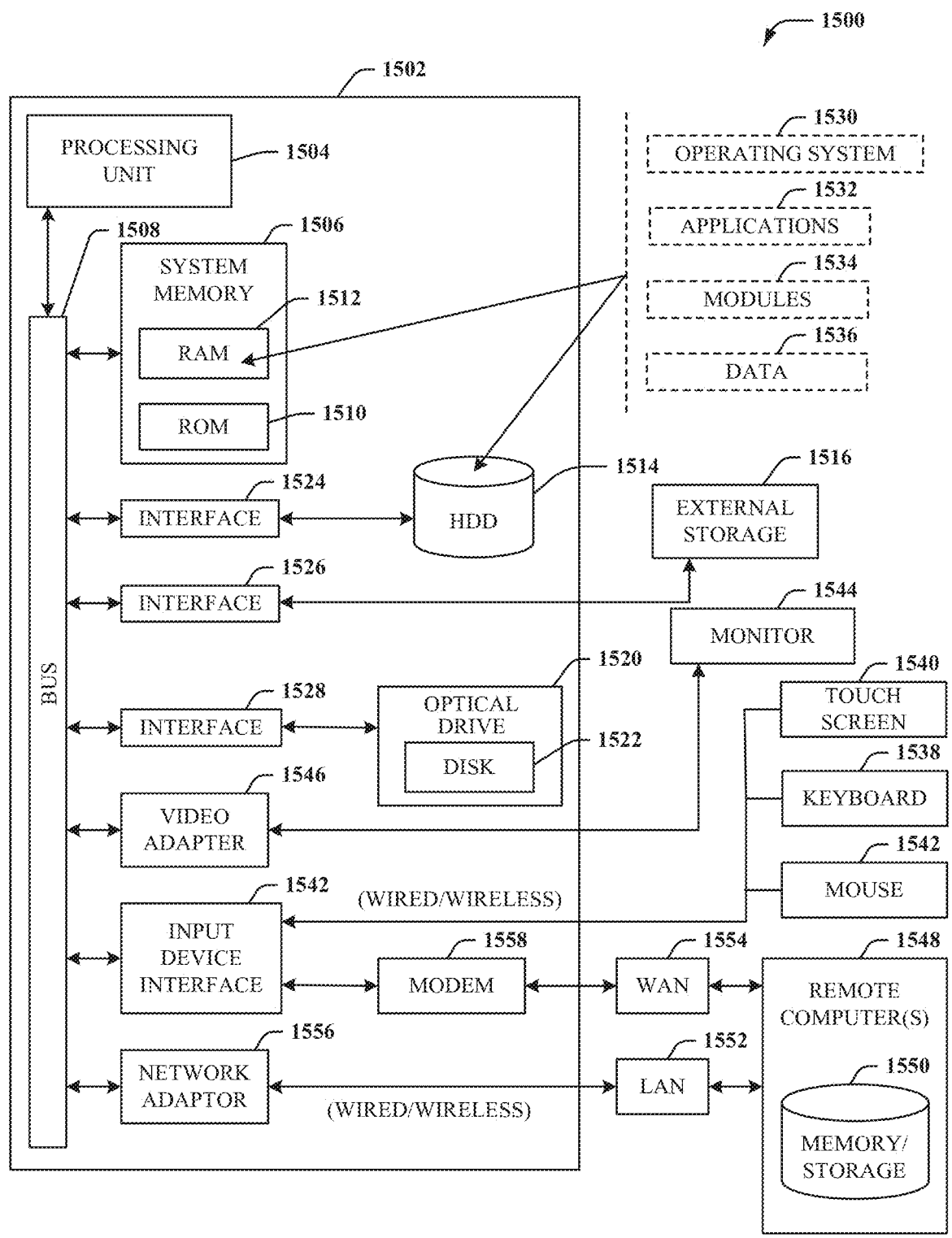
FIG. 15 is an example computing environment.
Figure 16:
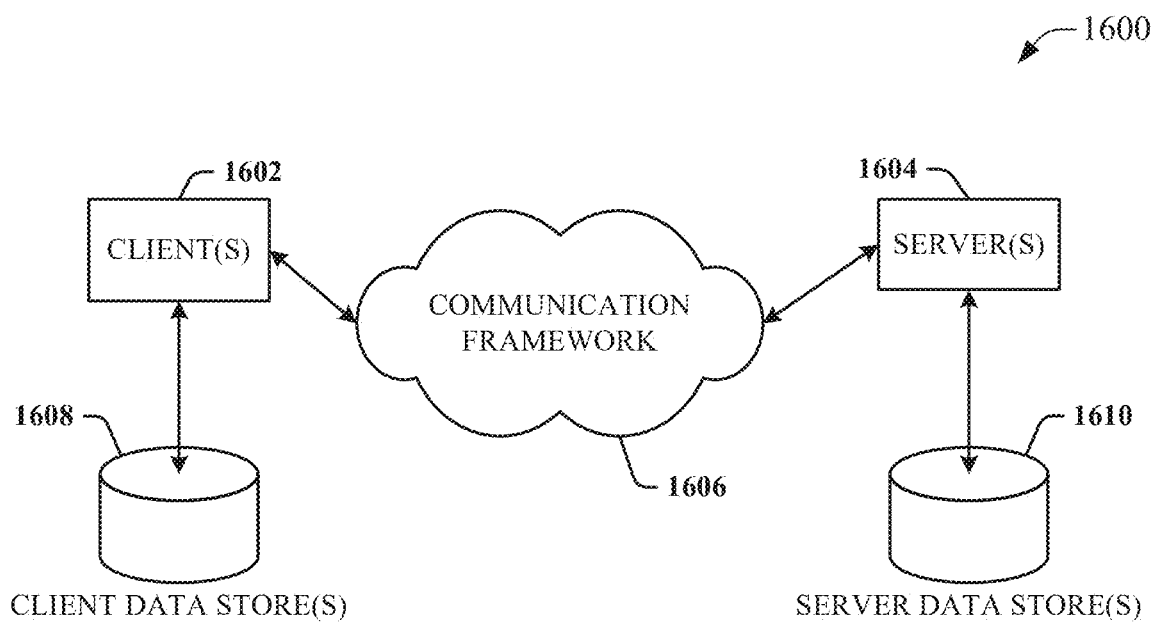
FIG. 16 is an example networking environment.

In order to provide a context for the various aspects of the disclosed subject matter, FIGS. 15 and 16 as well as the following discussion are intended to provide a brief, general description of a suitable environment in which the various aspects of the disclosed subject matter may be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 15, the example environment 1500 for implementing various embodiments of the aspects described herein includes a computer 1502, the computer 1502 including a processing unit 1504, a system memory 1506 and a system bus 1508. The system bus 1508 couples system components including, but not limited to, the system memory 1506 to the processing unit 1504. The processing unit 1504 can be any of various commercially available processors. Dual microprocessors and other multi-processor architectures can also be employed as the processing unit 1504.

The system bus 1508 can be any of several types of bus structure that can further interconnect to a memory bus (with or without a memory controller), a peripheral bus, and a local bus using any of a variety of commercially available bus architectures. The system memory 1506 includes ROM 1510 and RAM 1512. A basic input/output system (BIOS) can be stored in a non-volatile memory such as ROM, erasable programmable read only memory (EPROM), EEPROM, which BIOS contains the basic routines that help to transfer information between elements within the computer 1502, such as during startup. The RAM 1512 can also include a high-speed RAM such as static RAM for caching data.

The computer 1502 further includes an internal hard disk drive (HDD) 1514 (e.g., EIDE, SATA), one or more external storage devices 1516 (e.g., a magnetic floppy disk drive (FDD) 1516, a memory stick or flash drive reader, a memory card reader, etc.) and an optical disk drive 1520 (e.g., which can read or write from a CD-ROM disc, a DVD, a BD, etc.). While the internal HDD 1514 is illustrated as located within the computer 1502, the internal HDD 1514 can also be configured for external use in a suitable chassis (not shown). Additionally, while not shown in environment 1500, a solid state drive (SSD) could be used in addition to, or in place of, an HDD 1514. The HDD 1514, external storage device(s) 1516 and optical disk drive 1520 can be connected to the system bus 1508 by an HDD interface 1524, an external storage interface 1526 and an optical drive interface 1528, respectively. The interface 1524 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1502, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1512, including an operating system 1530, one or more application programs 1532, other program modules 1534 and program data 1536. All or portions of the operating system, applications, modules, and/or data can also be cached in the RAM 1512. The systems and methods described herein can be implemented utilizing various commercially available operating systems or combinations of operating systems.

Computer 1502 can optionally comprise emulation technologies. For example, a hypervisor (not shown) or other intermediary can emulate a hardware environment for operating system 1530, and the emulated hardware can optionally be different from the hardware illustrated in FIG. 15. In such an embodiment, operating system 1530 can comprise one virtual machine (VM) of multiple VMs hosted at computer 1502. Furthermore, operating system 1530 can provide runtime environments, such as the Java runtime environment or the .NET framework, for application programs 1532. Runtime environments are consistent execution environments that allow application programs 1532 to run on any operating system that includes the runtime environment. Similarly, operating system 1530 can support containers, and application programs 1532 can be in the form of containers, which are lightweight, standalone, executable packages of software that include, e.g., code, runtime, system tools, system libraries and settings for an application.

Further, computer 1502 can be enable with a security module, such as a trusted processing module (TPM). For instance with a TPM, boot components hash next in time boot components, and wait for a match of results to secured values, before loading a next boot component. This process can take place at any layer in the code execution stack of computer 1502, e.g., applied at the application execution level or at the operating system (OS) kernel level, thereby enabling security at any level of code execution.

A user can enter commands and information into the computer 1502 through one or more wired/wireless input devices, e.g., a keyboard 1538, a touch screen 1540, and a pointing device, such as a mouse 1542. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1504 through an input device interface 1544 that can be coupled to the system bus 1508, but can be connected by other interfaces, such as a parallel port, an IEEE 1394 serial port, a game port, a USB port, an IR interface, a BLUETOOTH® interface, etc.

A monitor 1544 or other type of display device can be also connected to the system bus 1508 via an interface, such as a video adapter 1546. In addition to the monitor 1544, a computer typically includes other peripheral output devices (not shown), such as speakers, printers, etc.

The computer 1502 can operate in a networked environment using logical connections via wired and/or wireless communications to one or more remote computers, such as a remote computer(s) 1548. The remote computer(s) 1548 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1550 is illustrated. The logical connections depicted include wired/wireless connectivity to a local area network (LAN) 1552 and/or larger networks, e.g., a wide area network (WAN) 1554. Such LAN and WAN networking environments are commonplace in offices and companies, and facilitate enterprise-wide computer networks, such as intranets, all of which can connect to a global communications network, e.g., the Internet.

When used in a LAN networking environment, the computer 1502 can be connected to the local network 1552 through a wired and/or wireless communication network interface or adapter 1556. The adapter 1556 can facilitate wired or wireless communication to the LAN 1552, which can also include a wireless access point (AP) disposed thereon for communicating with the adapter 1556 in a wireless mode.

When used in a WAN networking environment, the computer 1502 can include a modem 1558 or can be connected to a communications server on the WAN 1554 via other means for establishing communications over the WAN 1554, such as by way of the Internet. The modem 1558, which can be internal or external and a wired or wireless device, can be connected to the system bus 1508 via the input device interface 1542. In a networked environment, program modules depicted relative to the computer 1502 or portions thereof, can be stored in the remote memory/storage device 1550. It will be appreciated that the network connections shown are example and other means of establishing a communications link between the computers can be used.

When used in either a LAN or WAN networking environment, the computer 1502 can access cloud storage systems or other network-based storage systems in addition to, or in place of, external storage devices 1516 as described above. Generally, a connection between the computer 1502 and a cloud storage system can be established over a LAN 1552 or WAN 1554 e.g., by the adapter 1556 or modem 1558, respectively. Upon connecting the computer 1502 to an associated cloud storage system, the external storage interface 1526 can, with the aid of the adapter 1556 and/or modem 1558, manage storage provided by the cloud storage system as it would other types of external storage. For instance, the external storage interface 1526 can be configured to provide access to cloud storage sources as if those sources were physically connected to the computer 1502.

The computer 1502 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

FIG. 16 is a schematic block diagram of a sample computing environment 1600 with which the disclosed subject matter can interact. The sample computing environment 1600 includes one or more client(s) 1602. The client(s) 1602 can be hardware and/or software (e.g., threads, processes, computing devices). The sample computing environment 1600 also includes one or more server(s) 1604. The server(s) 1604 can also be hardware and/or software (e.g., threads, processes, computing devices). The servers 1604 can house threads to perform transformations by employing one or more embodiments as described herein, for example. One possible communication between a client 1602 and servers 1604 can be in the form of a data packet adapted to be transmitted between two or more computer processes. The sample computing environment 1600 includes a communication framework 1606 that can be employed to facilitate communications between the client(s) 1602 and the server(s) 1604. The client(s) 1602 are operably connected to one or more client data store(s) 1608 that can be employed to store information local to the client(s) 1602. Similarly, the server(s) 1604 are operably connected to one or more server data store(s) 1610 that can be employed to store information local to the servers 1604.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A system, comprising:
a memory that stores executable components; and
a processor, operatively coupled to the memory, that executes the executable components, the executable components comprising:
a conversion component configured to perform an analysis of a legacy industrial control program based on an analytic module and to, based on a result of the analysis of the legacy industrial control program, perform a conversion of at least a segment of the legacy industrial control program having a first format to yield a converted industrial control program having a second format supported by the system, and to incorporate the converted industrial control program into an industrial system project; and
a training component configured to train the analytic module to, as part of the conversion of the at least the segment of the legacy industrial control program, identify code segments of the legacy industrial control program that correspond to types of automation functions for which automation objects or predefined code modules supported by the system are available.

2. The system of claim 1, wherein the training component is further configured to train the analytic module based on training analysis performed on aggregated system project data collected by the system from multiple industrial system projects.

3. The system of claim 1, wherein the legacy industrial control program comprises a program developed in a development environment of another system, and the first format is a format supported by the other system.

4. The system of claim 1, wherein the conversion component is further configured to replace a code segment of the legacy industrial control program with an automation object or a predefined code module in the converted industrial control program.

5. The system of claim 1, wherein an automation object, of the automation objects, has associated therewith at least one of an input, an output, an analytic routine, an alarm, a security feature, or a graphical representation of an associated industrial asset.

6. The system of claim 1, wherein the conversion component is further configured to identify a hierarchy of code segments within the legacy industrial control program that pass data to one another, and to reorganize the legacy industrial control program based on the hierarchy of code segments within the legacy industrial control program to yield the converted industrial control program.

7. The system of claim 1, wherein the conversion component is further configured to infer an algorithmic flowchart or a state machine on which the legacy industrial control program was based, and to generate an engineering document for the industrial system project based on the algorithmic flowchart or the state machine.

8. The system of claim 7, wherein the engineering document is at least one of a state machine diagram representing a control algorithm implemented by the legacy industrial control program, an I/O drawing, or a bill of materials.

9. The system of claim 1, wherein the industrial system project comprises at least one of executable industrial control code, an industrial visualization application, industrial device configuration data configured to set a configuration parameter of an industrial device, an engineering drawing, or a bill of materials.

10. A method, comprising:
receiving, by a system comprising a processor, design input that defines aspects of an industrial control and monitoring project;
generating, by the system, system project data based on the design input, wherein the system project data comprises at least an executable industrial control program;
performing, by the system, a conversion of at least a portion of a legacy industrial control program having a first format to yield a converted industrial control program having a second format supported by the system, wherein the performing of the conversion comprises analyzing the legacy industrial control program based on an analytic module and as part of the conversion of the at least the portion of the legacy industrial control program to identify a code segment of the legacy industrial control program that corresponds to a type of automation function for which an automation object or a predefined code module supported by the system is available; and
integrating, by the system, the converted industrial control program into the system project data.

11. The method of claim 10, wherein the performing of the conversion further comprises replacing the code segment of the legacy industrial control program with the automation object or the predefined code module in the converted industrial control program.

12. The method of claim 10, further comprising training, by the system, the analytic module to identify the code segment of the legacy industrial control program that corresponds to the type of automation function based on training analysis performed on aggregated system project data collected by the system from multiple industrial control and monitoring projects.

13. The method of claim 10, wherein the legacy industrial control program is a program developed using a development environment of another system, and the first format is a format supported by the other system.

14. The method of claim 10, wherein the automation object is associated with a type of industrial asset and has associated therewith at least one of an input, an output, an analytic routine, an alarm, a security feature, or a graphical representation of the type of industrial asset.

15. The method of claim 10, wherein the performing of the conversion further comprises:
identifying a hierarchy of code segments within the legacy industrial control program that pass data to one another; and
reorganizing the legacy industrial control program based on the hierarchy of code segments within the legacy industrial control program to yield the converted industrial control program.

16. The method of claim 10, further comprising:
inferring, by the system, an algorithmic flowchart or a state machine on which the legacy industrial control program was based; and
generating, by the system, an engineering document based on the algorithmic flowchart or the state machine.

17. The method of claim 16, wherein the generating of the engineering document further comprises generating at least one of a state machine diagram representing a control algorithm implemented by the legacy industrial control program, an I/O drawing, or a bill of materials.

18. A non-transitory computer-readable medium having stored thereon instructions that, in response to execution, cause a system comprising a processor to perform operations, the operations comprising:
- receiving, from a client device, design input that defines control design aspects of an industrial automation project;
- generating system project data based on the design input, wherein the system project data comprises at least an executable industrial control program;
- converting at least a portion of a legacy industrial control program having a first format to yield a converted industrial control program having a second format supported by the system, wherein the converting comprises identifying, based on an analysis of the legacy industrial control program using an analytic module and as part of the converting of the at least the portion of the legacy industrial control program, a code segment of the legacy industrial control program that corresponds to a type of automation function for which an automation object or a predefined code module supported by the system is available; and
- incorporating the converted industrial control program into the system project data.

19. The non-transitory computer-readable medium of claim 18, wherein the converting further comprises replacing the code segment of the legacy industrial control program with the automation object or the predefined code module in the converted industrial control program.

20. The non-transitory computer-readable medium of claim 18, wherein the operations further comprise training the analytic module to identify the code segment of the legacy industrial control program that corresponds to the type of automation function based on training analysis performed on aggregated system project data collected by the system from multiple industrial automation projects.

* * * * *